(12) United States Patent
Hayashi et al.

(10) Patent No.: US 10,171,803 B2
(45) Date of Patent: Jan. 1, 2019

(54) IMAGE CAPTURING APPARATUS, CALIBRATION METHOD, AND NON-TRANSITORY COMPUTER-READABLE MEDIUM FOR CALCULATING PARAMETER FOR A POINT IMAGE RESTORATION PROCESS

(71) Applicant: FUJIFILM Corporation, Tokyo (JP)

(72) Inventors: Kenkichi Hayashi, Saitama (JP); Masahiko Sugimoto, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/837,709

(22) Filed: Aug. 27, 2015

(65) Prior Publication Data

US 2015/0365661 A1 Dec. 17, 2015

Related U.S. Application Data

(63) Continuation of application No. PCT/JP2013/080412, filed on Nov. 11, 2013.

(30) Foreign Application Priority Data

Mar. 27, 2013 (JP) .................. 2013-066622

(51) Int. Cl.
*H04N 17/02* (2006.01)
*H04N 17/00* (2006.01)
(Continued)

(52) U.S. Cl.
CPC .......... *H04N 17/002* (2013.01); *G06T 5/003* (2013.01); *G06T 7/80* (2017.01); *H04N 5/208* (2013.01);
(Continued)

(58) Field of Classification Search
CPC .... H04N 5/23293; G06T 5/003; G06T 7/0018
See application file for complete search history.

(56) References Cited

U.S. PATENT DOCUMENTS

| | | | |
|---|---|---|---|
| 5,873,007 A | 2/1999 | Ferrada Suarez | |
| 6,437,823 B1 * | 8/2002 | Zhang .................. | H04N 17/002 348/187 |

(Continued)

FOREIGN PATENT DOCUMENTS

| | | |
|---|---|---|
| CN | 1220543 A | 6/1999 |
| CN | 102625043 A | 8/2012 |

(Continued)

OTHER PUBLICATIONS

International Search Report, issued in PCT/JP2013/080412, dated Dec. 3, 2013.

(Continued)

*Primary Examiner* — Jefferey F Harold
*Assistant Examiner* — Humam M Satti
(74) *Attorney, Agent, or Firm* — Birch, Stewart, Kolasch & Birch, LLP

(57) ABSTRACT

An image capturing apparatus according to an aspect of the present invention includes an image capturing unit, a display unit that displays an imaged picture imaged by the image capturing unit and a guide linearly shaped along a sagittal direction or a tangential direction in the imaged picture, the guide assisting imaging of a calibration image used for calibration in a point image restoration process, and a parameter calculation unit that calculates a parameter for the point image restoration process on the basis of the calibration image imaged by the image capturing unit with assistance from the guide.

21 Claims, 24 Drawing Sheets

(51) Int. Cl.
    *H04N 5/232*     (2006.01)
    *H04N 5/235*     (2006.01)
    *G06T 5/00*     (2006.01)
    *H04N 5/208*     (2006.01)
    *H04N 5/217*     (2011.01)
    *G06T 7/80*     (2017.01)

(52) U.S. Cl.
    CPC ......... *H04N 5/2178* (2013.01); *H04N 5/2353* (2013.01); *H04N 5/2356* (2013.01); *H04N 5/23209* (2013.01); *H04N 5/23222* (2013.01); *H04N 5/23293* (2013.01)

(56) References Cited

U.S. PATENT DOCUMENTS

| | | | | |
|---|---|---|---|---|
| 8,013,896 B2* | 9/2011 | Tachibana | ............... | G03B 17/00 348/208.5 |
| 2003/0222984 A1* | 12/2003 | Zhang | ............... | H04N 17/002 348/187 |
| 2005/0036032 A1* | 2/2005 | Lee | ............... | H04N 17/002 348/188 |
| 2005/0212955 A1* | 9/2005 | Craig | ............... | H04N 5/232 348/362 |
| 2006/0110147 A1* | 5/2006 | Tomita | ............... | H04N 5/23212 396/55 |
| 2006/0233436 A1* | 10/2006 | Ma | ............... | G06K 9/00624 382/154 |
| 2007/0242142 A1* | 10/2007 | Okazaki | ............... | G03B 13/18 348/239 |
| 2009/0128663 A1 | 5/2009 | Seto | | |
| 2009/0161945 A1* | 6/2009 | Morgan-Mar | ....... | G06K 9/3216 382/154 |
| 2010/0045825 A1* | 2/2010 | Hatori | ............... | G02B 7/36 348/241 |
| 2010/0079615 A1 | 4/2010 | Hatakeyama | | |
| 2010/0103386 A1* | 4/2010 | Kubota | ............... | H04N 9/3185 353/70 |
| 2010/0119146 A1* | 5/2010 | Inazumi | ............... | G06T 5/003 382/153 |
| 2010/0246989 A1* | 9/2010 | Agrawal | ............... | G06T 5/003 382/255 |
| 2011/0129154 A1* | 6/2011 | Shimodaira | ............... | G06T 7/80 382/190 |
| 2011/0135213 A1 | 6/2011 | Hatakeyama | | |
| 2011/0228133 A1* | 9/2011 | Itoh | ............... | G03B 17/02 348/231.99 |
| 2011/0268350 A1* | 11/2011 | Tsukada | ............... | G06T 1/00 382/154 |
| 2011/0285879 A1* | 11/2011 | Hatakeyama | ............... | G06T 5/003 348/241 |
| 2012/0075502 A1* | 3/2012 | Watanabe | ............... | H04N 5/772 348/231.99 |
| 2012/0092505 A1 | 4/2012 | Odawara | | |
| 2012/0141027 A1* | 6/2012 | Hatakeyama | ............... | H04N 1/58 382/167 |
| 2012/0189226 A1 | 7/2012 | Okada | | |
| 2012/0195520 A1* | 8/2012 | Ishii | ............... | H04N 1/4092 382/255 |
| 2012/0243792 A1* | 9/2012 | Kostyukov | ............... | G06T 5/003 382/199 |
| 2012/0281132 A1 | 11/2012 | Ogura et al. | | |
| 2012/0307133 A1* | 12/2012 | Gao | ............... | G02B 27/0075 348/349 |
| 2013/0038748 A1* | 2/2013 | Hatakeyama | ............... | G06T 5/003 348/222.1 |
| 2013/0050539 A1* | 2/2013 | Watanabe | ............... | G06T 5/003 348/241 |
| 2013/0050544 A1* | 2/2013 | Kano | ............... | H04N 9/045 348/242 |
| 2013/0063625 A1* | 3/2013 | Yamanaka | ............... | G06K 9/36 348/239 |
| 2013/0188018 A1* | 7/2013 | Stevens | ............... | G06T 7/0004 348/46 |
| 2013/0208088 A1* | 8/2013 | Ishii | ............... | G03B 35/00 348/43 |
| 2015/0154753 A1* | 6/2015 | Schalattmann | ............... | G06T 7/80 348/143 |
| 2016/0182903 A1* | 6/2016 | Grundhofer | ............... | G06T 7/80 348/187 |
| 2016/0286107 A1* | 9/2016 | Sommerlade | ............... | G06T 7/80 |

FOREIGN PATENT DOCUMENTS

| | | |
|---|---|---|
| JP | 2009-141951 A | 6/2009 |
| JP | 2010-86138 A | 4/2010 |
| JP | 2011-4239 A | 1/2011 |
| JP | 2011-124692 A | 6/2011 |
| JP | 2011-193277 A | 9/2011 |
| JP | 2012-3454 A | 1/2012 |
| WO | WO 2012/063449 A1 | 5/2012 |

OTHER PUBLICATIONS

Written Opinion of the International Searching Authority, issued in PCT/JP2013/080412, dated Dec. 3, 2013.
International Preliminary Report on Patentability dated Oct. 8, 2015, issued in PCT/JP2013/080412 (Forms PCT/IB/338, PCT/IB/373 and PCT/ISA/237).
Chinese Office Action and Search Report, dated Sep. 4, 2017, for counterpart Chinese Application No. 201380075125.4 is provided, along with an English translation.

* cited by examiner

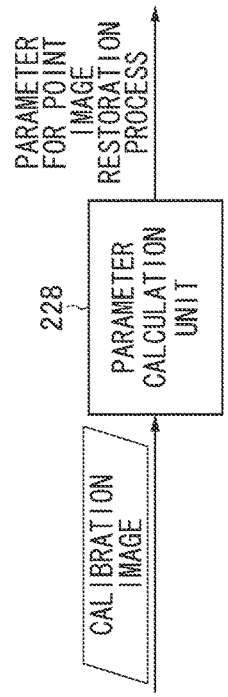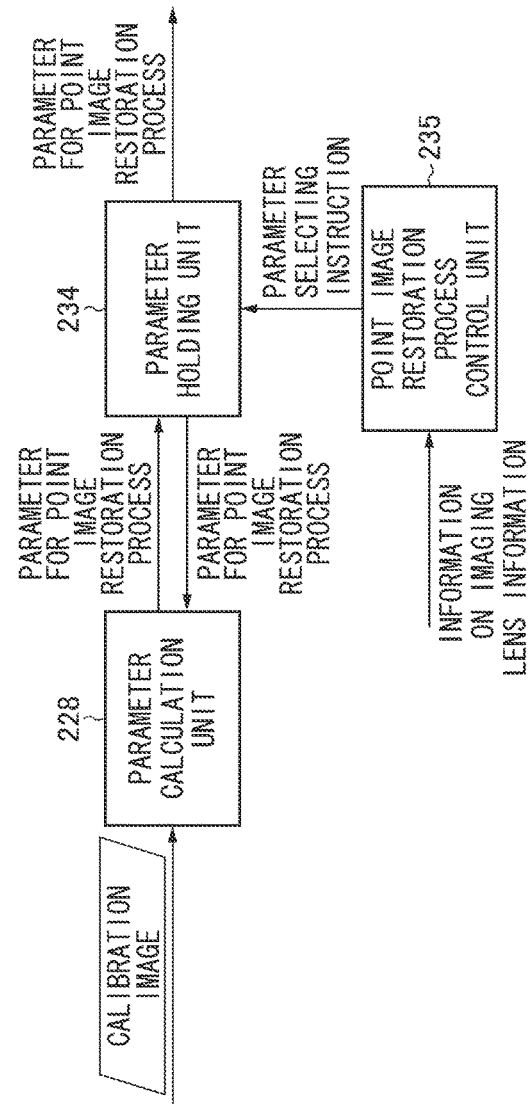
FIG. 7A
FIG. 7B

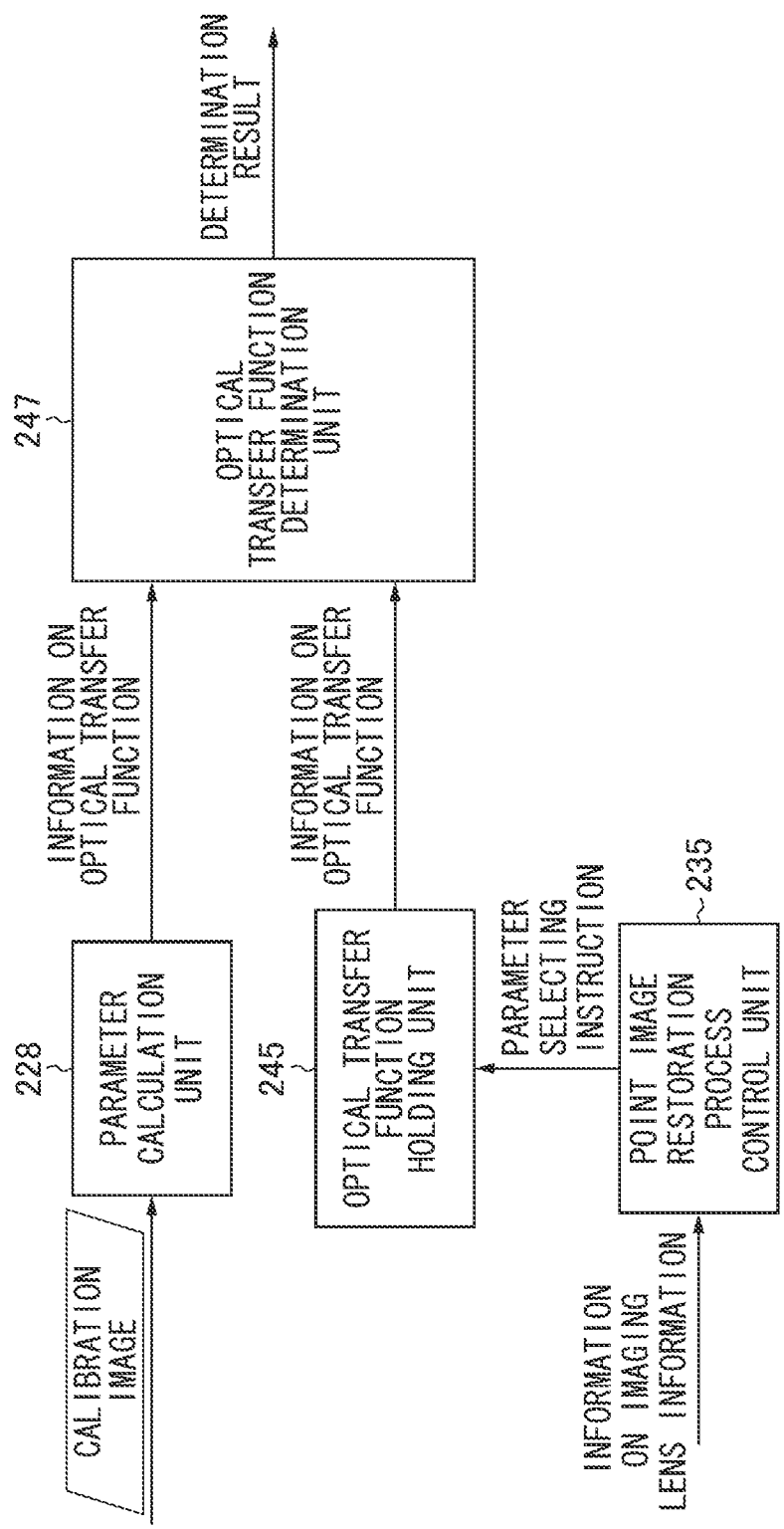

IMAGE CAPTURING APPARATUS, CALIBRATION METHOD, AND NON-TRANSITORY COMPUTER-READABLE MEDIUM FOR CALCULATING PARAMETER FOR A POINT IMAGE RESTORATION PROCESS

CROSS-REFERENCE TO RELATED APPLICATIONS

This application is a Continuation of PCT International Application No. PCT/JP2013/080412 filed on Nov. 11, 2013, which claims priority under 35 U.S.C. § 119(a) to Japanese Patent Application No. 2013-066622 filed on Mar. 27, 2013. Each of the above application(s) is hereby expressly incorporated by reference, in its entirety, into the present application.

BACKGROUND OF THE INVENTION

1. Field of the Invention

The present invention relates to a technology concerning an image capturing apparatus, and particularly relates to a point image restoration process performed on an imaged picture on the basis of a point spread function (PSF).

2. Description of the Related Art

Image deterioration caused by various aberrations of an optical system (e.g., imaging lens) sometimes occurs in an imaged picture obtained by imaging a subject by an image capturing apparatus such as a digital camera.

In order to prevent the image deterioration (diffraction blur, peripheral blur, chromatic aberration of magnification, etc.) caused by the aberration, a technology has been devised in which image data of the subject image is subjected to image processing to eliminate (correct) the image deterioration caused by the aberration.

The image deterioration due to the aberration may be represented by a point spread function (PSF), and an imaged picture deteriorated in an image quality can be subjected to the point image restoration process on the basis of the point spread function to restore the image quality. In other words, the point image restoration process is a process for canceling the image deterioration by subjecting imaged picture data to a restoration filter (inverse filter) of the point spread function.

Since the image deterioration is affected by piece-to-piece variations in the optical system (lens), it is desirable to adjust a parameter for the restoration filter depending on the piece-to-piece variations in the optical system.

Japanese Patent Application Laid-Open No. 2010-086138 (hereinafter referred to as PTL 1) discloses a technology in which measured PSF data obtained from imaging data of a chart for adjustment imaged by each image recording device is used for restoring image data to enable restoration depending on an individual difference (piece-to-piece variations).

Japanese Patent Application Laid-Open No. 2011-124692 (hereinafter referred to as PTL 2) discloses a technology in which an optical image formed so as to be given a predetermined blur through an extended depth of field optical system is captured, and the restoration filter is created from an intensity distribution of a blurred border and an intensity distribution of a targeted border.

Japanese Patent Application Laid-Open No. 2011-193277 (hereinafter referred to as PTL 3) discloses a technology in which even if a lens has a difference in characteristics due to production tolerance, an area having a large square error of a frequency component before and after a restoration process is automatically extracted and displayed in accordance with a restoration item specified by a user such as resolution, and color blur to adjust a parameter for the specified restoration item in response to a user adjustment operation.

SUMMARY OF THE INVENTION

However, PTL 1 does not disclose a technology concerning imaging the chart for adjustment in terms of assistance in imaging. For this reason, the chart for adjustment may not be properly imaged by the technology described in PTL 1 in some cases.

PTL 2 does not disclose a technology concerning capturing an optical image formed so as to be given a predetermined blur through the extended depth of field optical system in terms of assistance in capturing. For this reason, an image may not be properly captured by the technology described in PTL 2 in some cases.

PTL 3 does not disclose a technology concerning acquiring the image data in terms of assistance in imaging. For this reason, the image data may not be properly acquired by the technology described in PTL 3 in some cases.

The present invention has been made in consideration of such a circumstance, and has an object to provide an image capturing apparatus capable of precisely and easily acquiring an image (calibration image) suitable for parameter adjustment (calibration) in performing the point image restoration process, a calibration method, a program, and a recording medium.

In order to achieve the above object, an image capturing apparatus according to an aspect of the invention includes an image capturing unit, a display unit that displays an imaged picture imaged by the image capturing unit and a guide linearly shaped along a sagittal direction or a tangential direction in the imaged picture, the guide assisting imaging of a calibration image used for calibration in a point image restoration process, and a parameter calculation unit that calculates a parameter for the point image restoration process on the basis of the calibration image imaged by the image capturing unit with assistance from the guide.

This can provide the image capturing apparatus capable of acquiring the proper calibration image with assistance from the guide and performing the point image restoration process suitable for the individual image capturing apparatus.

In the image capturing apparatus, it is preferable that the guide displayed on the display unit is arranged depending on an image height of the imaged picture. This allows a precise calibration image corresponding to the image height to be acquired.

In the image capturing apparatus, it is preferable that the guide displayed on the display unit is a first guide and a second guide not parallel with the first guide.

This allows more precise calibration image to be acquired and enables the calibration concerning more precise parameter for the point image restoration process.

In the image capturing apparatus, it is preferable that the image capturing unit has a bracketing imaging mode, and the parameter calculation unit calculates the parameter for the point image restoration process on the basis of a plurality of the calibration images imaged with bracketing by the image capturing unit with assistance from the guide.

This allows the calibration image to be acquired under various imaging conditions and enables the point image restoration process to be performed properly under the various imaging conditions.

In the image capturing apparatus, it is preferable that the image capturing unit images the calibration image for each f-number in the bracketing imaging mode.

This allows the calibration image to be acquired for each f-number, and enables more precise calibration.

In the image capturing apparatus, it is preferable that the parameter calculation unit calculates the parameter for the point image restoration process on the basis of the plurality of the calibration images imaged by the image capturing unit with assistance from the guide.

This enables the calibration concerning more accurate parameter for the point image restoration process.

In the image capturing apparatus, it is preferable that the display unit further displays an imaging condition for imaging the calibration image, and the parameter calculation unit calculates the parameter for the point image restoration process under the imaging condition on the basis of the calibration image imaged by the image capturing unit with assistance from the guide. This allows the calibration image to be imaged under a precise imaging condition.

In the image capturing apparatus, it is preferable that the image capturing unit has an interchangeable lens. Moreover, in the image capturing apparatus, it is preferable that the image capturing unit has a lens which modulates a phase to extend a depth of field.

In the image capturing apparatus, it is preferable that the image capturing apparatus further includes a parameter holding unit that stores therein in advance the parameter for the point image restoration process, in which the parameter calculation unit adjusts the parameter stored in the parameter holding unit on the basis of the calibration image imaged by the image capturing unit with assistance from the guide.

This eliminates necessity of calculation to create the parameter for the point image restoration process from the beginning on the basis of the calibration image, reducing a calculation load and calculation time.

In the image capturing apparatus, it is preferable that the image capturing apparatus further includes an image analysis unit that analyzes the imaged picture; and an image analysis determination unit that determines whether or not the imaged picture is adequate as the calibration image on the basis of an analysis result of the imaged picture by the image analysis unit and outputs a determination result, in which the display unit further displays determination information on the basis of the determination result.

This allows the precise calibration image to be acquired on the basis of image analysis and enables the adequate point image restoration process.

In the image capturing apparatus, it is preferable that the image analysis unit analyzes the imaged picture regarding a brightness or blur amount of the imaged picture.

In the image capturing apparatus, it is preferable that the image analysis unit acquires information on the f-number regarding the imaged picture, and analyzes the brightness of the imaged picture on the basis of a threshold of a exposure time set for the calibration, a threshold of an imaging sensitivity set for the calibration, and the acquired information on the f-number.

This allows the calibration image having a suitable brightness to be acquired and enables more precise point image restoration process.

In the image capturing apparatus, it is preferable that the image analysis unit further includes a coincidence degree determination unit that determines a coincidence degree between the guide and the imaged picture imaged by the image capturing unit and outputs a resultant coincidence degree, and the image analysis determination unit determines whether or not the imaged picture is adequate as the calibration image on the basis of the resultant coincidence degree.

This enables imaging of a subject precisely coinciding with the guide and allows a precise calibration image to be acquired.

In the image capturing apparatus, it is preferable that the image capturing apparatus further includes an optical transfer function holding unit that stores therein in advance information on an optical transfer function of the lens as the parameter for the point image restoration process, and an optical transfer function determination unit that determines whether or not a difference is larger than a threshold, the difference being a difference between information on an optical transfer function of a lens calculated by the parameter calculation unit on the basis of the plurality of the calibration images imaged by the image capturing unit for each guide and the information on the optical transfer function of the lens stored in the optical transfer function holding unit, and outputs a determination result concerning the optical transfer function, in which the display unit further displays determination information on the basis of the determination result concerning the optical transfer function.

This allows the calibration image to be acquired depending on the optical transfer function of the individual lens.

In the image capturing apparatus, it is preferable that the information on the optical transfer function of the lens is at least one of a modulation transfer function and phase transfer function of the lens.

In the image capturing apparatus, it is preferable that the display unit displays an indication prompting change of the imaged picture depending on the determination result output by the image analysis determination unit.

In the image capturing apparatus, it is preferable that the display unit displays an indication prompting retake of the calibration image depending on the determination result output by the optical transfer function determination unit.

In order to achieve the above object, a calibration method according to another aspect of the invention includes a displaying step of displaying a captured image imaged by an image capturing unit and a guide assisting imaging of a calibration image used for calibration in a point image restoration process on a display unit, and a parameter calculating step of calculating a parameter for the point image restoration process on the basis of the calibration image imaged by the image capturing unit with assistance from the guide.

In order to achieve the above object, a non-transitory computer-readable medium recording a program according to another aspect of the invention causes a computer to execute a displaying step of displaying a captured image imaged by an image capturing unit and a guide assisting imaging of a calibration image used for calibration in a point image restoration process on a display unit, and a parameter calculating step of calculating a parameter for the point image restoration process on the basis of the calibration image imaged by the image capturing unit with assistance from the guide.

According to the invention, acquisition of the calibration image is assisted by the guide indication to enable easy acquisition of precise calibration image, enable proper calibration of the parameter for the point image restoration process, and enable the point image restoration process adapted to the individual image capturing apparatus.

BRIEF DESCRIPTION OF THE DRAWINGS

FIG. 7A is an illustration explaining about a parameter calculation unit.

FIG. 7B is an illustration explaining about the parameter calculation unit.

FIG. 16 is an illustration explaining the parameter calculation unit for carrying out a modification example 4 concerning the guide indication form.

DETAILED DESCRIPTION OF THE PREFERRED EMBODIMENTS

Hereinafter, a description is given of examples of the present invention with reference to the drawings.

Figure 1:
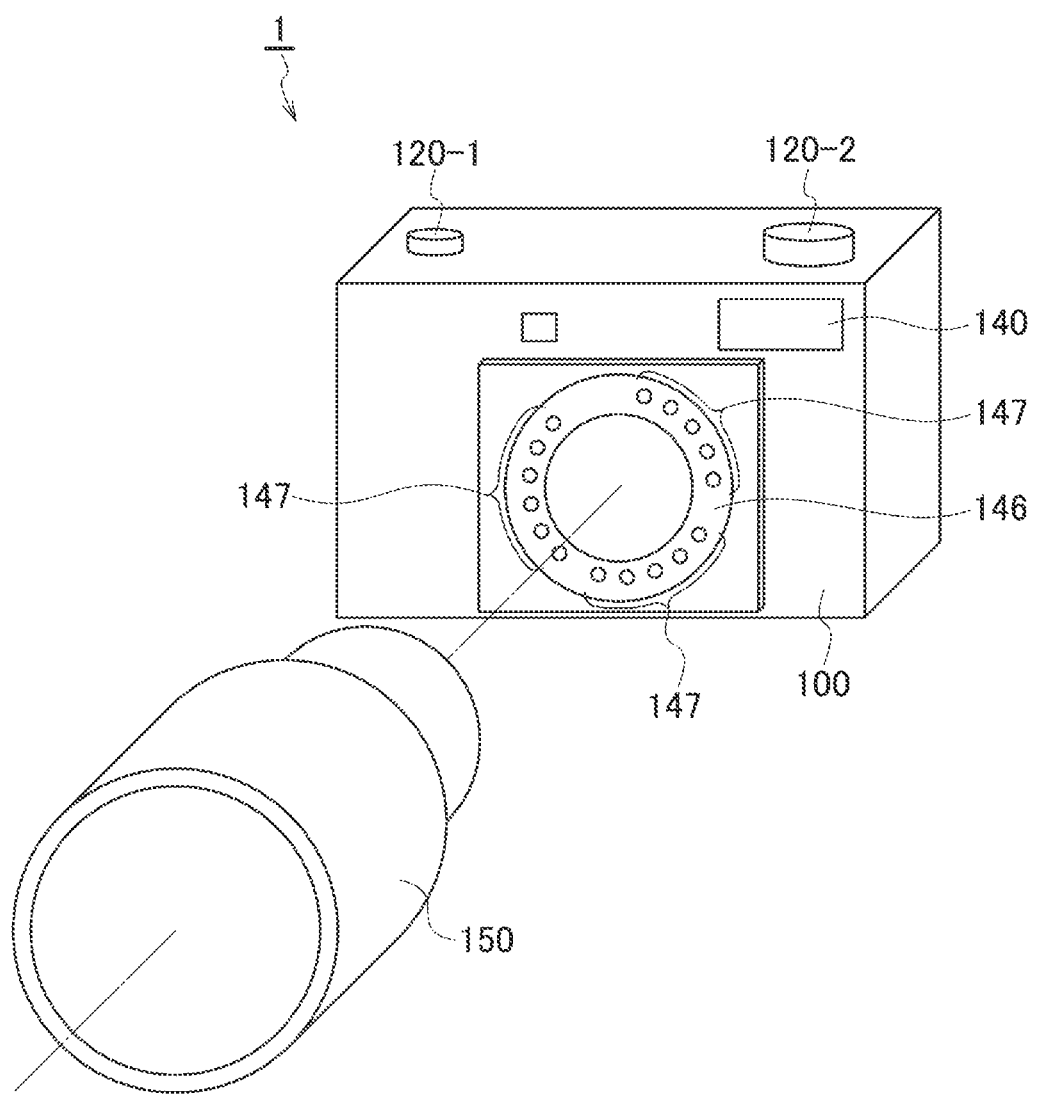
FIG. 1 is a front side perspective view showing an image capturing apparatus as one embodiment of the invention.

FIG. 1 is a perspective view showing an outer appearance of an image capturing apparatus 1 in an aspect of the invention.

The image capturing apparatus 1 includes an image capturing apparatus main body 100 and a lens device 150 interchangeably attached to the image capturing apparatus main body 100. The lens device 150 is interchangeably attached to the image capturing apparatus main body 100 in such a way that a mount 146 (transmitting device, receiving device) provided to the image capturing apparatus main body 100 is coupled with a mount (receiving device, transmitting device) (not shown) on the lens device 150 side corresponding to the mount 146. The image capturing apparatus main body 100 has a flash 140 provided on a front side thereof besides the mount 146, and the image capturing apparatus main body 100 has a release button (shutter button or shutter switch) 120-1 and a dial for setting an imaging mode (mode dial) 120-2 provided on a top side thereof.

The mount 146 is provided with a terminal 147 (transmitting device, receiving device), and the mount on the lens device 150 side is provided with a terminal (transmitting device, receiving device) (not shown). When the lens device 150 is attached to the image capturing apparatus main body 100, the terminal 147 is brought into contact with the terminal of the mount on the lens device 150 side corresponding to the terminal 147 to enable communication. The terminal 147 in FIG. 1 is conceptually represented, and positions and the number of the terminals in the invention are not limited to those in the figure.

Figure 2:
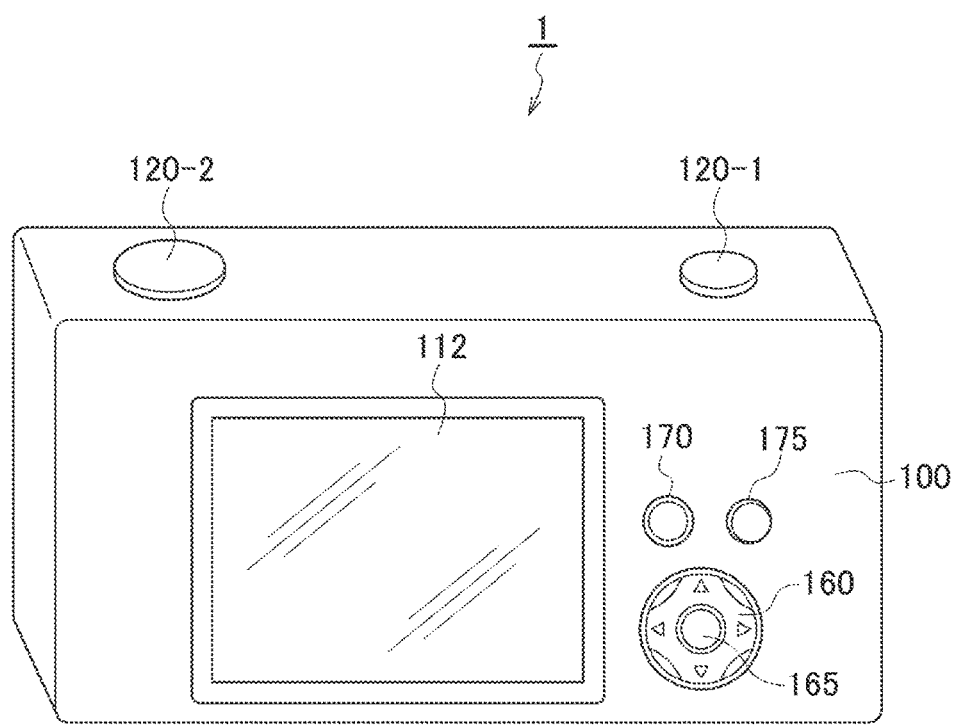
FIG. 2 is a back side perspective view showing the image capturing apparatus as one embodiment of the invention.

On the other hand, as shown in FIG. 2, the image capturing apparatus main body 100 has a monitor (display screen 112), cross-shaped button 160, MENU/OK button 165, play button 170, BACK button 175, and the like arranged on a back side thereof.

Figure 3:
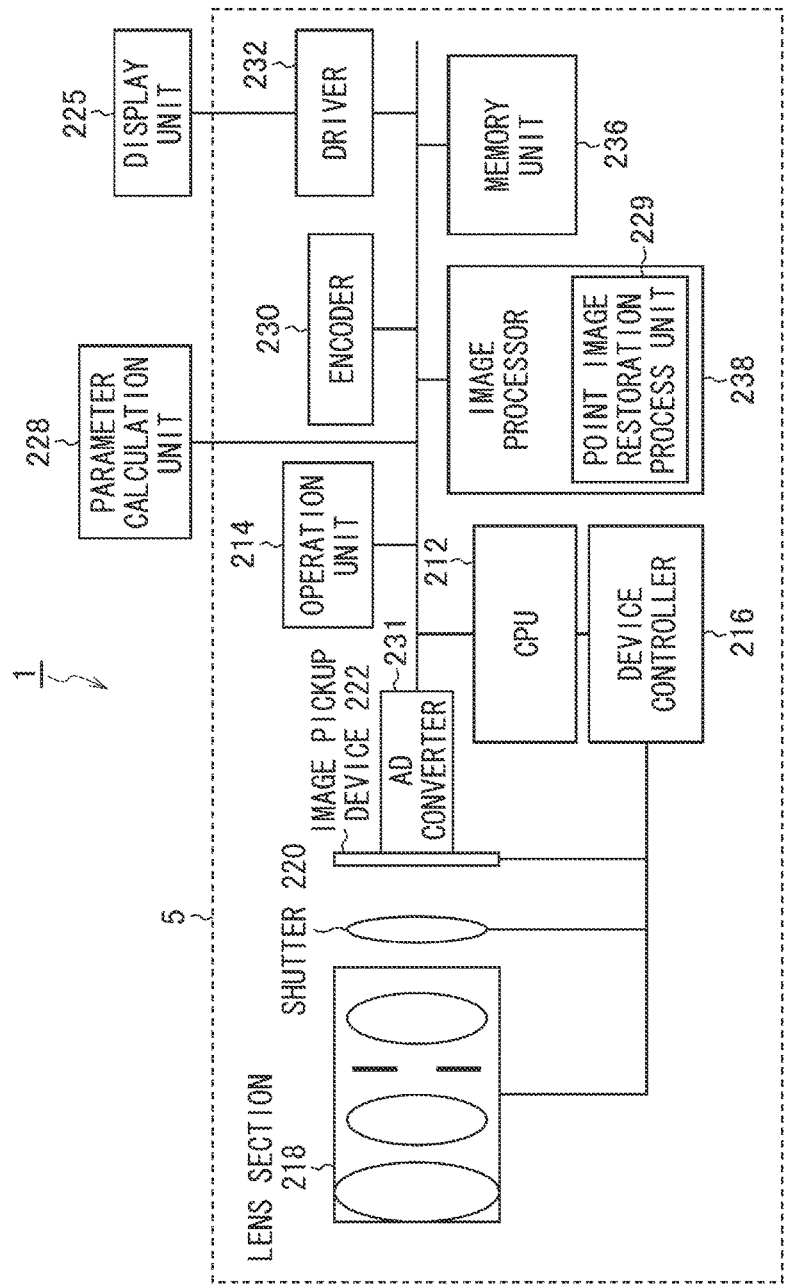
FIG. 3 is a functional block diagram of the image capturing apparatus in the invention.

FIG. 3 is a block diagram showing an embodiment of the image capturing apparatus 1 according to the invention. The image capturing apparatus 1 includes an image capturing unit 5, display unit 225, and parameter calculation unit 228. Further, the image capturing unit 5 includes a lens section 218, shutter 22, image pickup device 222, A/D converter 231, central processing unit (CPU) 212, operation unit 214, device controller 216, memory unit 236, image processor 238, point image restoration process unit 229, encoder 230, and driver 232.

The image capturing apparatus 1 can record an imaged picture obtained by capturing in an internal memory (memory unit 236) or an external recording medium (not shown). Operation of the entire apparatus of the image capturing apparatus 1 is overall controlled by the CPU 212.

The image capturing apparatus 1 is provided with operation unit 214 which includes the release button 120-1, mode dial 120-2, play button 170, MENU/OK button 165, cross-shaped button 160, zoom button, BACK button 175, and the like. A signal from the operation unit 214 is input to the CPU 212, and the CPU 212 controls circuits in the image capturing apparatus 1 on the basis of the input signal, that is, controls, for example, the lens section 218, shutter 220, and image pickup device 222 serving as image acquisition device via the device controller 216 as well as performs imaging operation control, image processing control, image data record/play control, display control of the display unit 225, and the like.

The lens section 218 includes a focus lens, zoom lens, diaphragm and the like. A light flux passing through the lens section 218 and shutter 220 forms an image on a light receiving surface of the image pickup device 222. The lens section 218 of the image capturing unit 5 may be interchangeable or non-interchangeable. The lens section 218 of the image capturing unit 5 may modulate a phase to extend a depth of field.

The image pickup device 222 has many light receiving elements (photodiodes) two-dimensionally arranged thereon, and a subject image formed on the light receiving surface of each photodiode is converted into a signal voltage (or electrical charge) of an amount corresponding to an amount of its incident light.

A color filter used for the image pickup device 222 may use various arrays (color filter array), with no specific limitation. For example, a Bayer array may be used for the image pickup device 222.

A signal electrical charge accumulated in the image pickup device 222 is read out as a voltage signal depending on the signal electrical charge on the basis of a readout signal added from the device controller 216. The voltage signal read out from the image pickup device 222 is added to the A/D converter 231, sequentially converted in the A/D converter 231 into a digital signal of R (red color), G (green color), or B (blue color) corresponding to the color filter array, and temporarily stored in the memory unit 236.

The memory unit 236 includes a SDRAM (Synchronous Dynamic Random Access Memory) that is a volatile memory, an EEPROM (Electronically Erasable and Programmable Read Only Memory) that is a rewritable and non-volatile memory, and the like. The SDRAM is used as a work area for executing a program by the CPU 212, or as a storage area for transiently holding a digital image signal which is captured and obtained. On the other hand, the EEPROM has stored therein a camera control program including an image processing program, defect information concerning the pixel in the image pickup device 222, and, various parameters, tables and the like used for the image processing or the like.

The image processor 238 subjects the digital image signal temporarily stored in the memory unit 236 to signal processing such as white balance correction, gamma correction processing, demosaic process (synchronization process), RGB/YC conversion, contour correction, chromatic aberration correction, point image restoration process, and the like. Here, the demosaic process is a process calculating all color information for each pixel from a mosaic image corresponding to a color filter array of a single-plate color image pickup device. For example, in a case of an image pickup device including the color filters of three colors of RGB, it is a process calculating the color information on all of RGB for each pixel in the mosaic image of RGB. In the invention, the order of the above signal processing is not specifically limited. The point image restoration process unit 229 is provided in the image processor 238. The point image restoration process unit 229 is described later.

The image data processed by the image processor 238 is encoded by the encoder 230 into data for displaying an image and output via the driver 232 to the display unit 225 disposed on a back side of the image capturing apparatus main body 100. This allows the subject image to be continuously displayed on a display screen (designated by reference numeral 112 in FIG. 2) of the display unit 225.

When the release button 120-1 in the operation unit 214 is pressed down at the first stage (halfway press), the CPU 212 starts an AF (Automatic Focus) operation and an AE (Automatic Exposure) operation. Then, the CPU 212 moves the focus lens of the lens section 218 via the device controller 216 in a light axis direction to control the focus lens to be positioned at a focusing position.

In halfway pressing the shutter button, the CPU 212 calculates brightness of the subject on the basis of the image data output from the A/D converter 231 to determine exposure conditions. Here, the exposure conditions are determined not only in halfway pressing the shutter button.

After the AE operation and the AF operation end, when the release button 120-1 is pressed down at the second stage (full press), the diaphragm, the shutter 220, and an electrical charge accumulation period in the image pickup device 222 are controlled based on the above determined exposure conditions to carry out main image capturing. The image data of an RGB mosaic image (image corresponding to the color filter array) obtained by A/D-converting data by the A/D converter 231, the data being read out from the image pickup device 222 in the main image capturing, is transiently stored in the memory unit 236.

The image data transiently stored in the memory unit 236 is properly read out by the image processor 238, and subjected in the image processor 238 to a predetermined signal processing including the white balance correction, gamma correction, demosaic (synchronization) process, RGB/YC conversion, contour correction, color correction, point image restoration process, and the like. The image data (YC data) obtained by the RGB/YC conversion is compressed in accordance with a predetermined compression format (e.g., JPEG (Joint Photographic Experts Group) method). The compressed image data is recorded in the internal memory or the external memory in a predetermined image file (e.g., Exif (Exchangeable Image File Format) file) format.

The image capturing unit 5 may have a bracketing imaging mode capable of bracketing imaging. The parameter calculation unit 228 calculates parameters for the point image restoration process on the basis of a plurality of calibration images imaged with bracketing by the image capturing unit 5 with assistance from a guide. Here, the bracketing imaging mode refers to successively imaging similar subjects with automatically imaging conditions being changed. The imaging conditions in this case include an f-number (aperture value), zoom position (focal length), subject distance and the like. The parameter for the point image restoration process is different for each imaging condition, and thus, it is preferable to acquire the calibration image for each imaging condition. Among others, it is desirable to perform calibration for each different value of the f-number (aperture value). The reason why is that, in imaging the calibration image, if the f-number (aperture value) changes, a brightness is changed, which significantly affects calibration accuracy. Additionally, since the parameter for the point image restoration process is different for each imaging condition, in a case where the calibration image is imaged for each imaging condition, imaging has to be performed many times with the imaging condition being changed. Therefore, a user is awfully burdened and imaging accuracy of the calibration image is likely to become reduced. For this reason, the imaging of the calibration image by use of the bracketing imaging enables the user to easily image the calibration image for each imaging condition and can prevent the imaging accuracy from being reduced.

Figure 4:
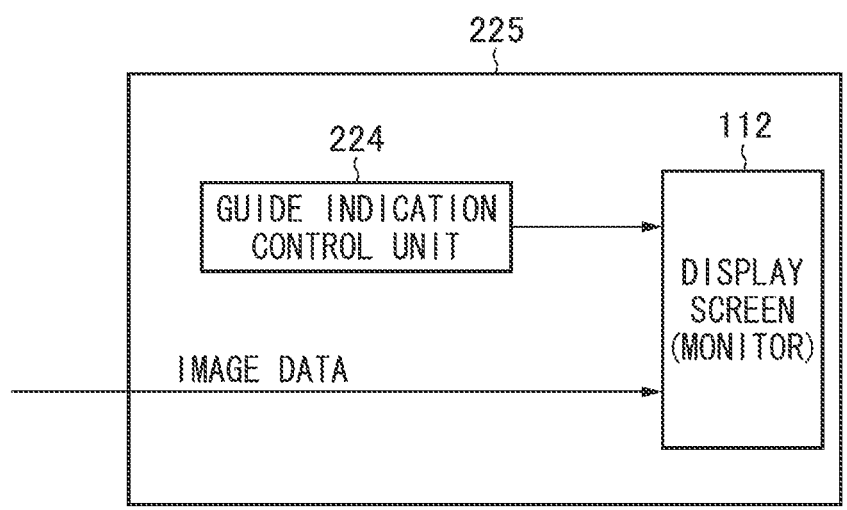
FIG. 4 is a functional block diagram in a display unit.

FIG. 4 is a functional block diagram of the display unit 225 in the image capturing apparatus 1. The display unit 225 mainly has the display screen (monitor) 112 and a guide indication control unit 224. The display unit 225 is entirely controlled by the CPU 212. The image data is transmitted via the driver 232 to the display screen 112. The transmitted image data is displayed on the display screen 112. The guide indication control unit 224 is controlled by the CPU 212.

Here, the image data displayed on the display screen 112 refers to image data of the imaged picture imaged by the image capturing unit 5. The imaged picture imaged by the image capturing unit 5, which is also referred to as a live view image or a through image, is an image displayed on the display screen 112 with the image capturing apparatus 1 being in a turned on state, for example.

The guide indication control unit 224 included in the display unit 225 performs the display control of the guide assisting the imaging of the calibration image used for the calibration in the point image restoration process. Here, the calibration image refers to an image obtained by imaging the imaged picture by the image capturing unit 5.

Figure 5:
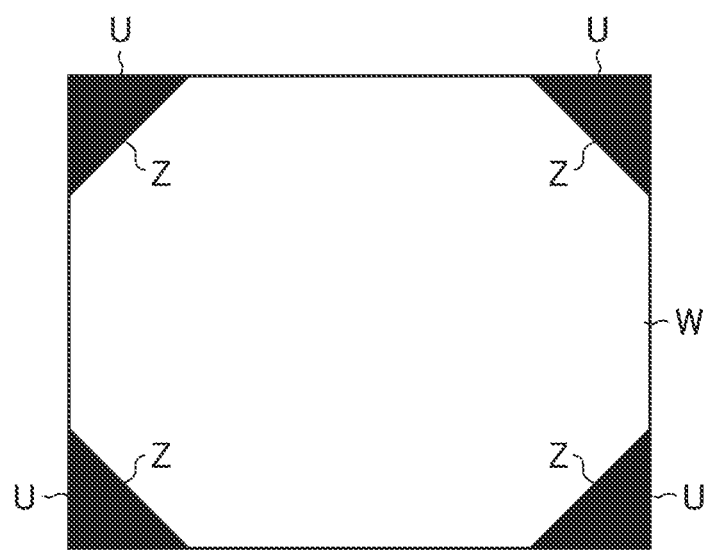
FIG. 5 is an illustration explaining a subject suitable in acquiring a calibration image.

FIG. 5 shows one example of a subject suitable for the calibration image. FIG. 5 shows a white paper sheet W, portions U of four blacked out corners of the white paper sheet W, and linear portions Z having large contrast along tangential directions in the imaged picture which are defined by blacking out four corners of the white paper sheet W. If a subject is imaged in which the portions Z having large contrast locate at four corners of the imaged picture and the portions Z having large contrast are linearly shaped along the tangential directions in the imaged picture, as shown in FIG. 5, the calibration image can be acquired which is suitable to adjust the parameter for the point image restoration process.

FIG. 6A to FIG. 6D illustrate a guide 10 displayed on the display screen 112 by the guide indication control unit 224. FIG. 6A to FIG. 6D each show a guide indication pattern concerning indication of the guide 10. FIG. 6A to FIG. 6D show the guide 10 on the display screen 112. The display screen 112 presents a state where automatic focus (AF) areas 20 and 22 are shown.

Note that expressions of right, left, lower, and upper are used in the description below, which are used to refer to a right side in a figure being explained when viewed from an observer, a left side in a figure being explained when viewed from an observer, a lower side in a figure being explained when viewed from an observer, and an upper side in a figure being explained when viewed from an observer.

The guide 10 shown in FIG. 6A to FIG. 6D has a linear shape along the tangential direction in the imaged picture displayed on the display screen 112. Here, the phrase "linear shape" is used to refer to any linear shape with no specific limitation. In other words, the guide 10 may be a solid straight line, a dotted straight line, or a semi-transparent straight line so as to view the imaged picture.

The linear shaped guide 10 enables a data acquisition area to be made larger in a case of performing the calibration. Further, the guide 10 is shaped linearly along a sagittal direction or tangential direction in the imaged picture. The guide 10 is preferably arranged in the sagittal direction or tangential direction in the imaged picture in terms of adjustment of the parameter for the point image restoration process. Specifically, in a case where a subject as coincides with the guide arranged in the sagittal direction or tangential direction in the imaged picture is imaged, it is possible to acquire data useful in terms of adjustment of the parameter for the point image restoration process.

Here, the expression "along the sagittal direction or tangential direction" means that the guide 10 may be deviated from the sagittal direction or tangential direction in a range in which the effects of the invention are not hampered.

Figure 6A:
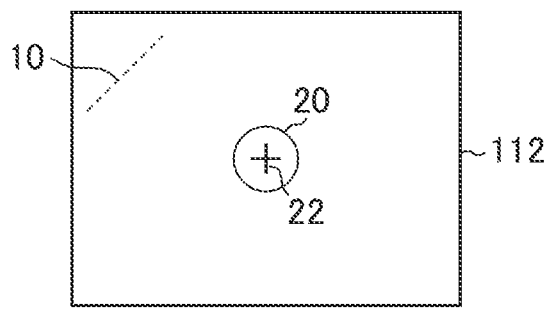
FIG. 6A is an illustration explaining an indication of a guide and a guide indication pattern.

Here, a reference of the sagittal direction or tangential direction is the imaged picture. It is actually desirable to define the sagittal direction or tangential direction of the planarly projected optical image of the image pickup device 222, but the calibration image can be obtained only on the basis of the image data received and acquired by the image pickup device. Therefore, the sagittal direction and the tangential direction are considered with the imaged picture being used as a reference, which is no problem. Here, the tangential direction refers to a tangent line direction with respect to a circumference with a center of the imaged picture as a reference, and the sagittal direction refers to a direction perpendicular to the tangential direction. In FIG. 6A, the guide 10 is arranged in an upper left area on the display screen 112 as a guide indication pattern 1. Assume the guide 10 shown in FIG. 6A is used to image the subject in FIG. 5, for example. In this case, imaging is performed in such a manner that the guide 10 shown in FIG. 6A coincides with the portion Z on the upper left in FIG. 5.

Figure 6B:
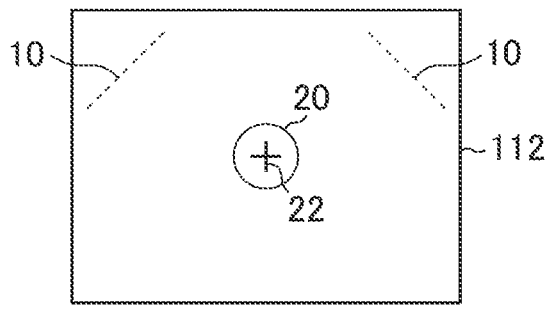
FIG. 6B is an illustration explaining the indication of the guide and the guide indication pattern.

In FIG. 6B, two guides 10 each as a guide indication pattern 2 are arranged in an upper left area and upper right area, respectively, on the display screen 112. Further, two guides 10 shown in FIG. 6B are constituted by a first guide and the second guide not parallel with the first guide. In other words, the guide (first guide) arranged in the upper left area and the guide (second guide) arranged in the upper right area on the display screen 112 in FIG. 6B are arranged so as not to be parallel with each other. This allows the calibration image capable of more precise calibration to be acquired.

Figure 6C:
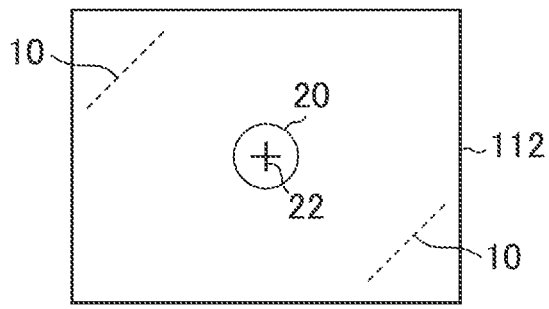
FIG. 6C is an illustration explaining the indication of the guide and the guide indication pattern.
Figure 6D:
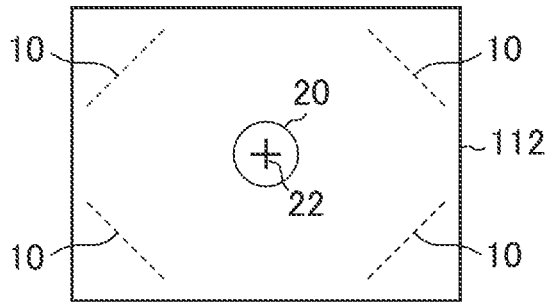
FIG. 6D is an illustration explaining the indication of the guide and the guide indication pattern.

In FIG. 6C, two guides 10 each as a guide indication pattern 3 are arranged in an upper left area and lower right area, respectively, on the display screen 112. In FIG. 6D, four guides 10 each as a guide indication pattern 4 are arranged in an upper left area, upper right area, lower right area and lower left area, respectively, on the display screen 112.

The invention is not limited to the guide indication patterns in the indication of the guide 10 shown in FIG. 6A to FIG. 6D. The guide indication pattern may use various forms in a range in which the effects of the invention are not hampered.

FIG. 7A and FIG. 7B are each an illustration explaining the parameter calculation unit 228 in the image capturing apparatus 1. The parameter calculation unit 228 calculates the parameter for the point image restoration process on the basis of the calibration image imaged by the image capturing unit 5 with assistance from the guide 10. Here, the parameter for the point image restoration process refers to a parameter contributing to content of the point image restoration process such as a restoration filter coefficient, coring coefficient, gain coefficient, and PSF (point spread function).

FIG. 7A shows a state where a point image restoration process parameter is calculated by the parameter calculation unit 228 on the basis of the calibration image acquired by the image capturing unit 5. The parameter calculation unit 228 calculates the parameter for the point image restoration process according to a kind of the parameter for the point image restoration process (restoration filter coefficient, coring coefficient, gain coefficient, PSF (point spread function) and the like) on the basis of the calibration image.

FIG. 7B illustrates a case where the image capturing apparatus 1 includes a parameter holding unit 234 that stores in advance the parameter for the point image restoration process. In the case where the image capturing apparatus 1 includes the parameter holding unit 234, the parameter calculation unit 228 may adjust the parameter stored in the parameter holding unit 234 in advance on the basis of the calibration image. Specifically, one or more parameters for the point image restoration process as a reference are stored in the parameter holding unit 234 in advance, and the parameter calculation unit 228 adjusts the parameter for the point image restoration process as a reference on the basis of the calibration image. This can reduce a calculation load on the parameter calculation unit 228 as compared to a case where a new parameter for the point image restoration process is created (calculated) from the beginning.

Further, in a case where the image capturing apparatus 1 includes a point image restoration process control unit 235, the point image restoration process control unit 235 issues a parameter selecting instruction to the parameter holding unit 234 depending on information on the imaging or lens information. Then, according to the parameter selecting instruction, the parameter for the point image restoration process stored in the parameter holding unit 234 is selected and sent to the parameter calculation unit 228 to adjust the parameter for the point image restoration process. Here, the information on the imaging refers to information on the imaging of the calibration image, including the aperture value (f-number), zoom position (focal length), subject distance and the like, for example. The lens information refers to information on the lens attached to the image capturing unit 5, including a model number of lens, kind of lens, maximum aperture value of lens, and the like, for example.

Here, the restoration filter coefficient refers to a parameter contributing to the content of the point image restoration process as described below.

Figure 8:
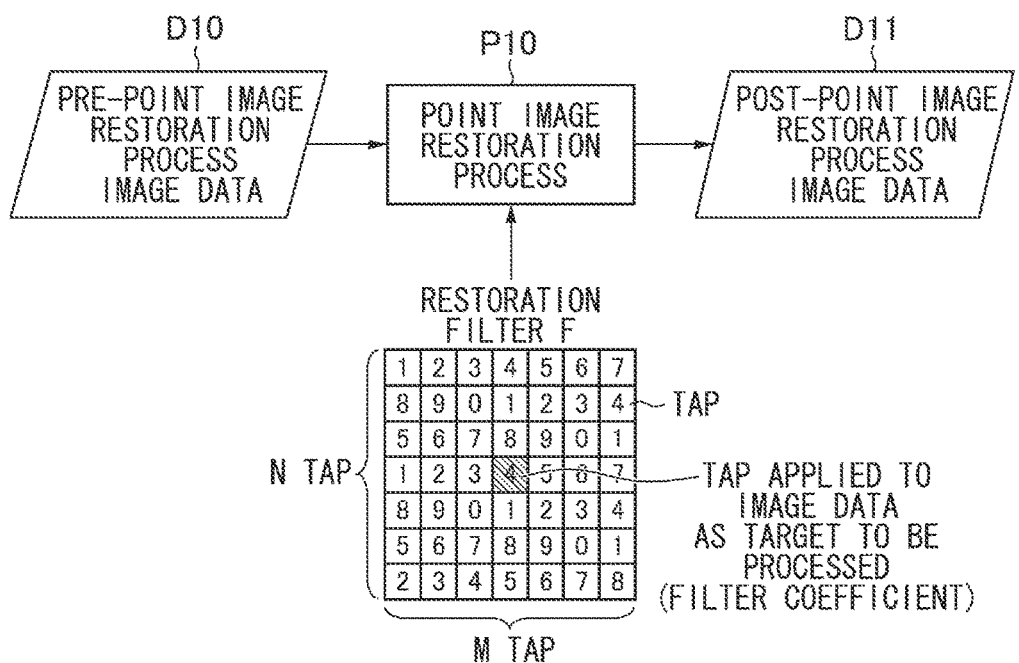
FIG. 8 is an illustration explaining a point image restoration process.

With reference to FIG. 8, a description is given of an outline of the point image restoration process performed in the point image restoration process unit 229 (see FIG. 3). FIG. 8 is a block diagram showing an outline of an example of the point image restoration process. A point image restoration process P10 is a process which a filtering process using a restoration filter F is performed to create post-point image restoration process image data D11 from pre-point image restoration process image data D10. Specifically, the restoration filter F constituted by N×M taps is applied to the image data as a target to be processed, and a filter coefficient assigned to each tap and corresponding pixel data (pixel data as a target to be processed in pre-point image restoration process image data D10 and adjacent pixel data) are subjected to a weighted average operation to be able to calculate the pixel data after the point image restoration process (post-point image restoration process image data D11). The weighted average processing using the restoration filter F can be applied to all pixel data constituting the image data while sequentially changing the target pixel to perform the point image restoration process.

In the image capturing apparatus 1, the pre-point image restoration process image data D10 is the image data for the calibration image. The image capturing apparatus 1 adjusts or calculates the filter coefficient on the basis of the calibration image (pre-point image restoration process image data D10). In this way, calculation of the filter coefficient on the basis of the image data for the calibration image obtained by the image capturing unit 5 included in the individual image capturing apparatus 1 enables calculation of the filter coefficient suitable for the individual image capturing unit 5.

Figure 9:
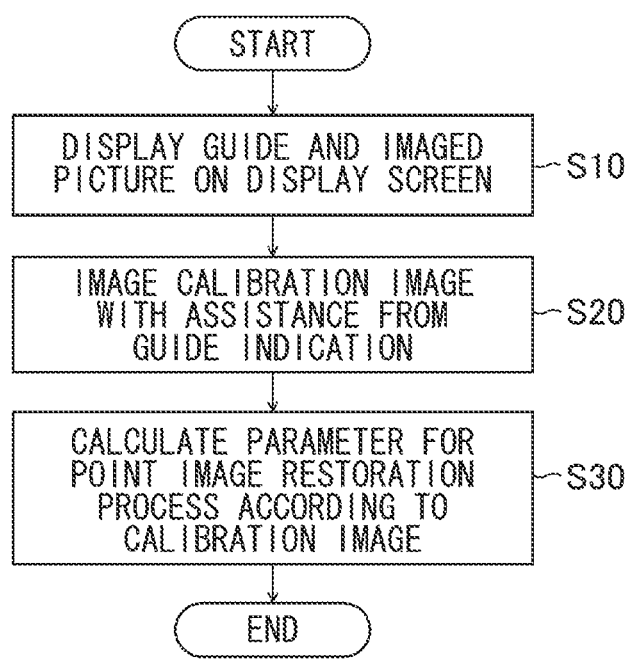
FIG. 9 is an operational flow diagram of the image capturing apparatus as one embodiment of the invention.

FIG. 9 is a diagram showing an operational flow of the image capturing apparatus 1. First, the guide 10 and the imaged picture imaged by the image capturing unit 5 are displayed on the display screen 112 of the image capturing apparatus 1 by the display unit 225 (step S10) (displaying step). Then, the calibration image is imaged by the image capturing unit 5 with assistance from the indication of the guide 10 (step S20).

After that, the parameter calculation unit 228 calculates the parameter for the point image restoration process on the basis of the calibration image imaged by the image capturing unit 5 (step S30) (parameter calculating step). The imaging of the calibration image may be automatically performed by the image capturing unit 5 or may be performed according to an imaging instruction by way of pressing down the shutter button by the user.

Modification Example 1 of Guide Indication Form

Figure 10A:
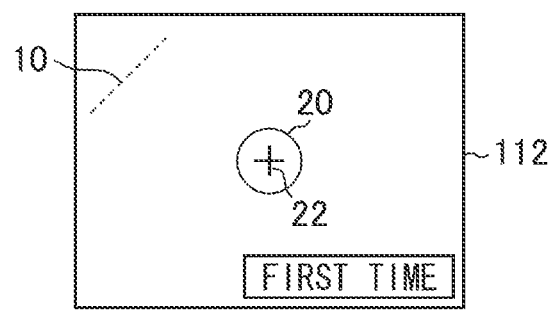
FIG. 10A is an illustration explaining a modification example 1 concerning a guide indication form.
Figure 10B:
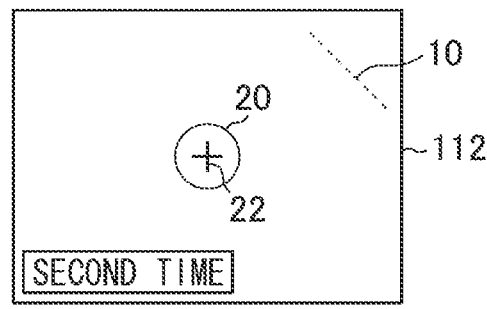
FIG. 10B is an illustration explaining the modification example 1 concerning the guide indication form.
Figure 10C:
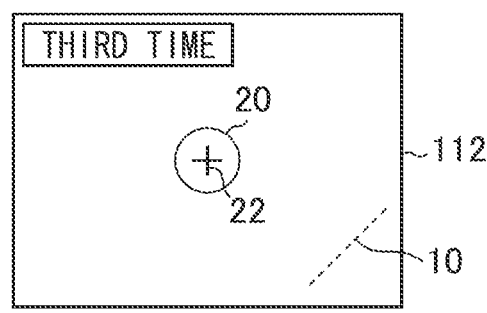
FIG. 10C is an illustration explaining the modification example 1 concerning the guide indication form.
Figure 10D:
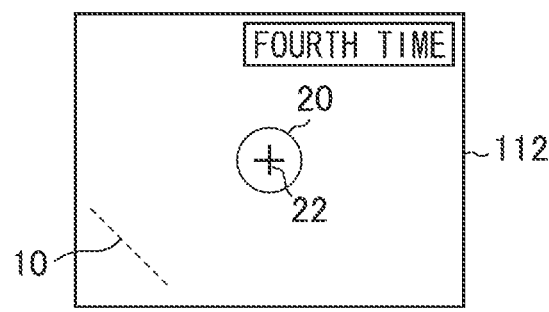
FIG. 10D is an illustration explaining the modification example 1 concerning the guide indication form.

FIG. 10A to FIG. 10D each show a modification example 1 concerning the indication form of the guide 10. Elements similar to those in FIG. 6A to FIG. 6D are designated by the same reference numerals and the description thereof is omitted. In comparing the modification example 1 of the guide indication forms shown in FIG. 10A to FIG. 10D with the guide indication pattern shown in FIG. 6D of the guide indication forms shown in FIG. 6A to FIG. 6D, the modification example 1 shown in FIG. 10A to FIG. 10D is different in that the subject satisfying each of guide indications at four corners is imaged at each of guide indications at four corners. Specifically, in the modification example 1 shown in FIG. 10A to FIG. 10D, first, the imaged picture satisfying the guide 10 arranged on the upper left is imaged, as shown in FIG. 10A. Next, the imaged picture satisfying the guide 10 arranged on the upper right is imaged, as shown in FIG. 10B. Next, the imaged picture satisfying the guide 10 arranged on the lower right is imaged, as shown in FIG. 10C. Next, the imaged picture satisfying the guide 10 arranged on the lower left is imaged, as shown in FIG. 10D. Then, the parameter for the point image restoration process is calculated by the parameter calculation unit 228 on the basis of four calibration images acquired with assistance from the guides 10 shown in FIG. 10A to FIG. 10D. On each of the display screens 112 shown in FIG. 10A to FIG. 10D, the order of imaging, that is, "the first time", . . . , "the fourth time" is displayed, but the order of imaging is not indispensable. A correspondence relationship between a position of the guide indication and the order of imaging is not limited to the examples in FIG. 10A to FIG. 10D.

The number of the guide indications is not limited to four as in the modification example 1 shown in FIG. 10A to FIG. 10D, and the parameter for the point image restoration process may be calculated on the basis of the plurality of the calibration images imaged by the image capturing unit 5 with assistance from each of the guides 10 different in an indicated position.

By using the guide indication form in the modification example 1, the subject satisfying the guide 10 can be easily found and the imaged picture satisfying the guide 10 is sure to be imaged.

Modification Example 2 of Guide Indication Form

FIG. 11A to FIG. 11D each show a modification example 2 concerning the indication form of the guide 10. Elements similar to those in FIG. 6A to FIG. 6D are designated by the same reference numerals and the description thereof is omitted. In comparing the modification example 2 of the guide indication forms shown in FIG. 11A to FIG. 11D with the guide indication pattern shown in FIG. 6D of the indication forms of the guide 10 shown in FIG. 6A to FIG. 6D, the modification example 2 shown in FIG. 11A to FIG. 11D is different in that an imaging condition 30 regarding the calibration image is displayed together with the guide 10 on the display screen 112. Specifically, the imaging condition 30 for imaging the calibration image is displayed on the display screen 112 (display unit 225) to notify a person performing the imaging of the necessary imaging condition 30 of the calibration image. Then, the parameter for the point image restoration process is calculated on the basis of the calibration image imaged under the necessary imaging condition.

Figure 11A:
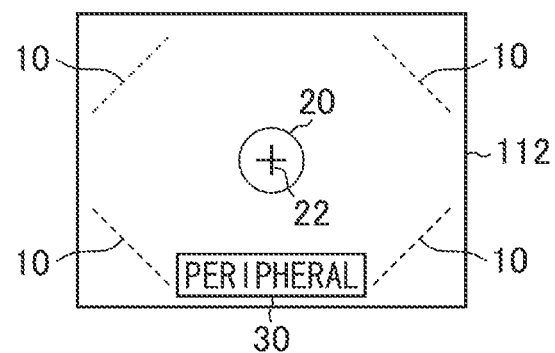
FIG. 11A is an illustration explaining a modification example 2 concerning the guide indication form.
Figure 11B:
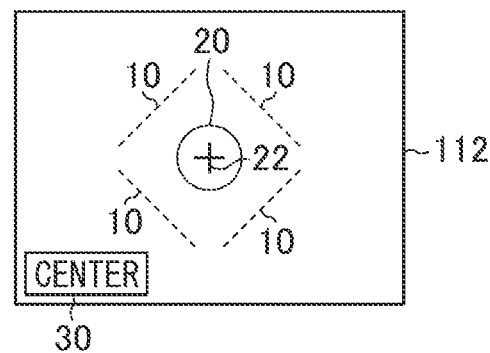
FIG. 11B is an illustration explaining the modification example 2 concerning the guide indication form.

Concretely, in FIG. 11A and FIG. 11B, the imaging condition 30 regarding an image height position is displayed on the display screen 112. Specifically, in FIG. 11A, acquisition of the calibration image is assisted so as to satisfy the guide 10 at a portion with a high image height position (peripheral portion in the imaged picture). On the other hand, in FIG. 11B, acquisition of the calibration image is assisted so as to satisfy the guide 10 at a portion with a low image height (central portion of the imaged picture). In this way, the guide 10 is arranged depending on the image height of the imaged picture such that calibration image corresponding to the image height can be acquired.

Figure 11C:
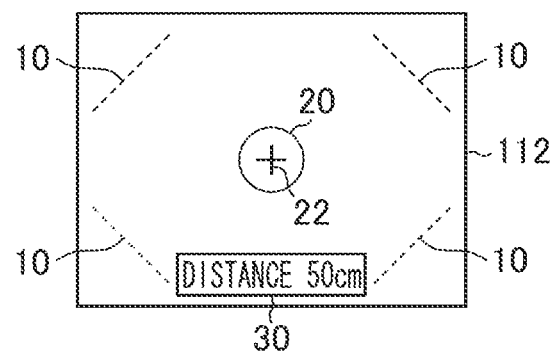
FIG. 11C is an illustration explaining the modification example 2 concerning the guide indication form.
Figure 11D:
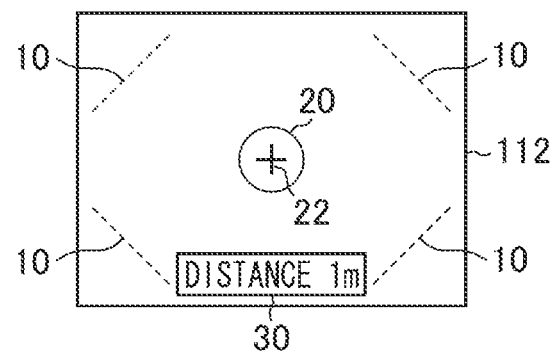
FIG. 11D is an illustration explaining the modification example 2 concerning the guide indication form.

In FIG. 11C and FIG. 11D, an imaging distance to the subject is displayed as the imaging condition 30 on the display screen 112. Specifically, in FIG. 11C, acquisition of the calibration image is prompted such that the imaging distance to the subject is 50 cm. In FIG. 11D, acquisition of the calibration image is made such that the imaging distance to the subject is 1 m. In this way, the guide 10 indicates the imaging distance to the subject on the display screen to enable acquisition of the calibration image having a desired imaging distance to the subject.

By using the guide indication form in the modification example 2, the calibration image is imaged under the proper imaging condition.

Modification Example 3 of Guide Indication Form

With reference to FIG. 12, FIG. 13, FIG. 14, FIG. 15A, and FIG. 15B, a description is given of a modification example 3 of the guide indication form. In the modification example 3 of the guide indication form, further displayed on the display screen 112 is determination information 35 sent by an image analysis determination unit 227 (see FIG. 15A and FIG. 15B).

Figure 12:
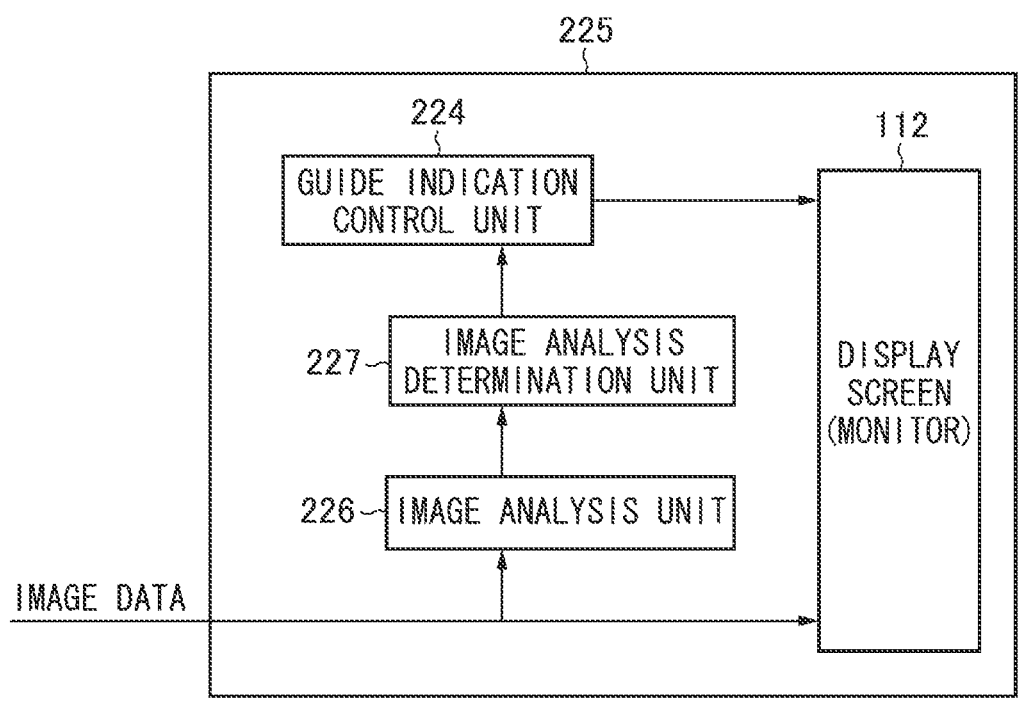
FIG. 12 is a functional block diagram of a display unit for carrying out a modification example 3 concerning the guide indication form.

In comparing the display unit 225 shown in FIG. 12 with the display unit 225 shown in FIG. 4, the display unit 225 shown in FIG. 12 is different in including an image analysis unit 226 and the image analysis determination unit 227. The image capturing apparatus 1 in the modification example 3 of the guide indication form includes the image analysis unit 226 that analyzes the imaged picture imaged by the image capturing unit 5, and the image analysis determination unit 227 that determines whether or not the imaged picture is adequate as the calibration image on the basis of an analysis result of the imaged picture by the image analysis unit 226 and outputs a determination result.

The image analysis unit 226 performs image analysis regarding a brightness or blur amount of the imaged picture imaged by the image capturing unit 5. Concretely, in the image analysis on the blur amount of the imaged picture imaged by the image capturing unit 5, the image analysis is performed on whether or not the imaged picture is in focus. The image analysis on the brightness of the imaged picture imaged by the image capturing unit 5 is described later.

The image analysis unit 226 sends the analysis result obtained by analyzing the image data to the image analysis determination unit 227. The image analysis determination unit 227 determines on the basis of the analysis result whether or not the imaged picture imaged by the image capturing unit 5 is adequate as the calibration image. For example, in a case where the imaged picture is not in focus or in a case where the imaged picture is very dark or very luminous, the imaged picture is determined to be not adequate as the calibration image.

Figure 13:
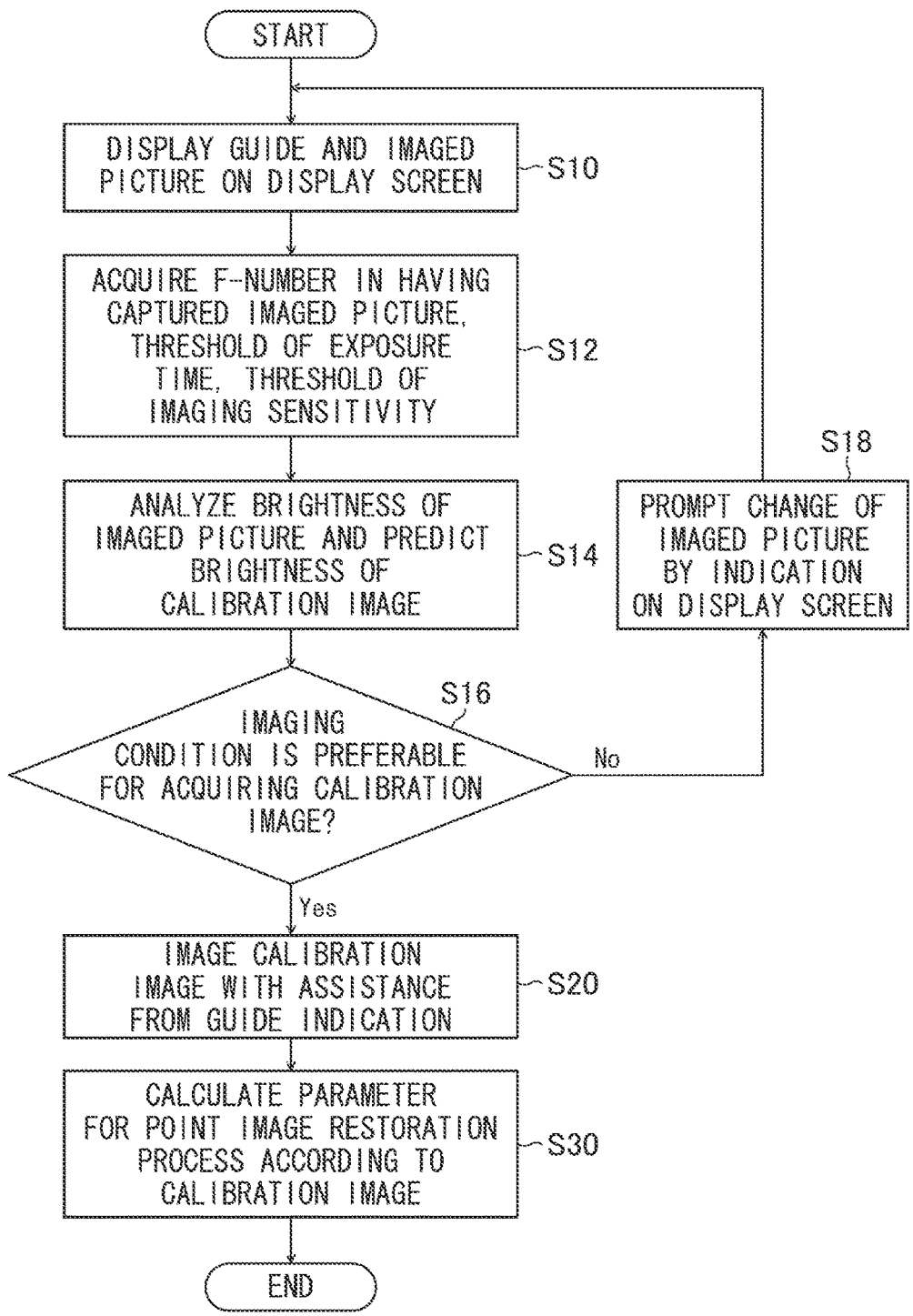
FIG. 13 is an operational flow diagram of the image capturing apparatus for carrying out the modification example 3 concerning the guide indication form.

FIG. 13 shows an example of the operational flow of the image capturing apparatus 1 in analyzing the brightness of the imaged picture imaged by the image capturing unit 5. In imaging the calibration image, if a shutter speed is slow (exposure time is long), the imaged picture is likely to be blurred to make a proper image as the calibration image difficult to acquire and calibration accuracy is lowered. Additionally, in imaging the calibration image, if an imaging sensitivity (gain) is high, a noise is likely to be generated to make a proper image as the calibration image difficult to acquire and the calibration accuracy is lowered. Therefore, in imaging the calibration image, the brightness more than a certain amount is required in many cases as compared to that in imaging a normal image.

Therefore, the f-number (aperture value) in having imaged the imaged picture is acquired, the brightness of the imaged picture is analyzed on the basis of a threshold of the exposure time set for the calibration, a threshold of the imaging sensitivity, and the acquired f-number (aperture value), and the imaged picture is determined to be proper or not as the calibration image and displayed, which can prompt the highly accurate calibration to be performed.

Particularly, in a case where the image capturing unit 5 has an interchangeable lens, the brightness (f-number) of the lens is different for each lens changed. For this reason, the lens information is acquired from the lens, and the brightness of the imaged picture may be analyzed from the f-number acquired on the basis of the acquired lens information, the threshold of the exposure time and the threshold of the imaging sensitivity.

In comparing the operational flow shown in FIG. 13 with the operational flow shown in FIG. 9, the operational flow shown in FIG. 13 is different in a point that the f-number regarding the imaged picture, the threshold of the exposure time, and the threshold of the imaging sensitivity are acquired (step S12), a point the brightness of the imaged picture is analyzed (step S14), and a point that it is determined whether or not the imaging condition is preferable for acquiring the calibration image (step S16). The same point in FIG. 13 as that in FIG. 9 is designated by the same reference numeral and the description thereof is omitted.

First, the guide 10 and the imaged picture are displayed on the display screen 112 (step S10). Then, the image analysis unit 226 acquires the f-number regarding the imaged picture, the threshold of the exposure time set for the calibration, and the threshold of the imaging sensitivity set for the calibration (step S12). Here, the f-number regarding the imaged picture refers to an f-number in a case where the imaged picture is imaged as the calibration image by the image capturing unit 5. Additionally, here, the threshold of the exposure time set for the calibration refers to a threshold of the exposure time in imaging the calibration image. The long exposure time in imaging the calibration image may cause the calibration image to be blurred. Therefore, it is preferable that the exposure time is short with taking into consideration the imaging of the proper calibration image. On the other hand, since the dark calibration image makes the precise parameter for the point image restoration process difficult to acquire, the exposure time also needs to be ensured to some degrees.

Examples of the threshold of the exposure time set for the calibration include 1/30 sec or less, preferably 1/60 sec or less, and more preferably 1/125 sec or less.

Here, the threshold of the imaging sensitivity set for the calibration refers to a threshold of the imaging sensitivity in imaging the calibration image. The high imaging sensitivity in imaging the calibration image may cause a noise to be generated in the calibration image. Therefore, it is preferable that the imaging sensitivity is low with taking into consideration the imaging of the proper calibration image. On the other hand, since the dark calibration image makes the precise parameter for the point image restoration process difficult to acquire, the imaging sensitivity also needs to be high to some degrees.

Examples of the threshold of the imaging sensitivity set for the calibration include ISO speed of 800 or less, preferably ISO speed of 400 or less, more preferably ISO speed of 250 or less (ISO: International Organization for Standardization).

Next, in a case where the brightness of the imaged picture is analyzed (photometry), and the analyzed imaged picture is acquired as the calibration image, the brightness of the calibration image is predicted on the basis of the information of the threshold of the exposure time set for the calibration, the threshold of the imaging sensitivity set for the calibration, and the acquired f-number (step S14). In other words, the f-number regarding the imaged picture, and the exposure time and imaging sensitivity for acquiring the proper calibration image are taken into consideration to allow the brightness of the calibration image to be predicted. Then, on the basis of the predicted brightness of the calibration image, it is determined whether or not the imaging condition is preferable for acquiring the calibration image (step S16). In a case where the predicted brightness of the calibration image is too dark or too luminous, the imaging condition is determined to be not preferable for acquiring the calibration image (No at step S16). On the other hand, in a case where the predicted brightness of the calibration image is proper, the imaging condition is determined to be preferable for acquiring the calibration image (Yes at step S16).

Here, the case where the predicted brightness of the calibration image is proper refers to a case where the predicted brightness of the calibration image is 8 Ev (Exposure Value) or more and 16 Ev or less, preferably 9 Ev or more and 15 Ev or less, more preferably 10 Ev or more and 14 Ev or less.

In a case where the calibration image is imaged while the f-number is sequentially changed by the bracketing imaging described above, the prediction and the determination are performed at step S14 and step S16 with taking into consideration a range of the f-number changed by the bracketing imaging. Specifically, the range of the f-number changed by the bracketing imaging is taken into consideration to predict the brightness at step S14 and the range of the f-number changed by the bracketing imaging is taken into consideration to determine whether or not the imaging condition is preferable at step S16. This enables the user to easily image the calibration image proper under the plural imaging conditions.

Then, in a case where the imaging condition is determined to be preferable for acquiring the calibration image, the calibration image is imaged with assistance from the guide indication (step S20). In a case where the imaging condition is determined to be not preferable for acquiring the calibration image, an indication prompting change of the imaged picture is displayed on the display screen 112 (step S18).

As shown in FIG. 13, the brightness of the calibration image is predicted and the condition is determined to be preferable for acquiring the calibration image to allow the proper calibration image to be acquired.

Figure 14:
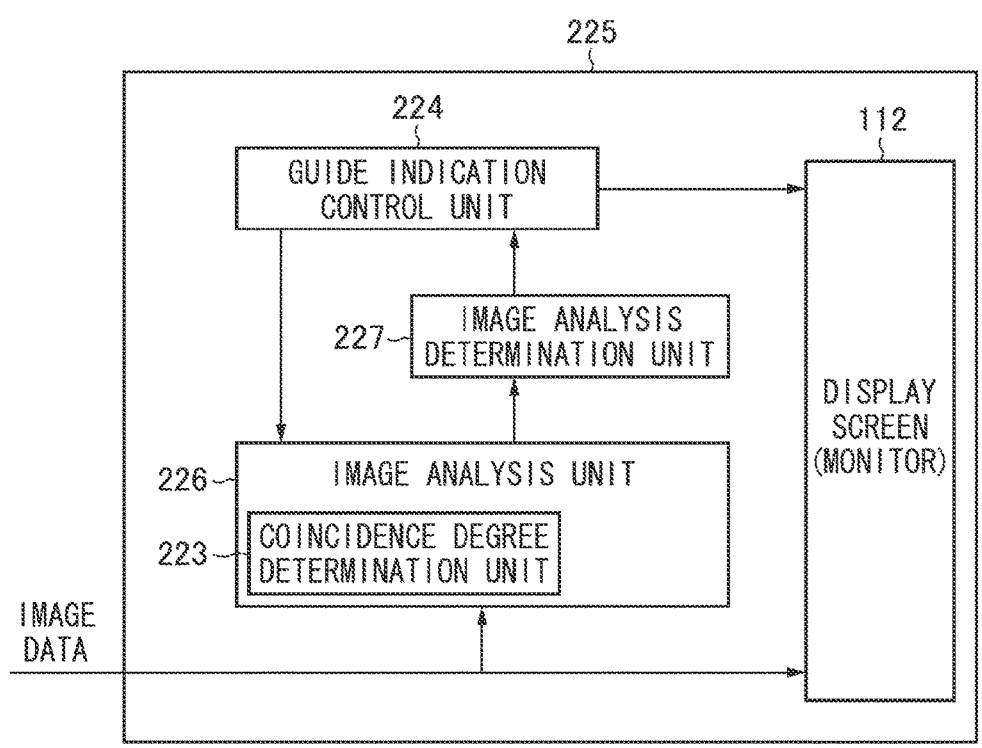
FIG. 14 is a functional block diagram of the display unit having a coincidence degree determination unit for carrying out the modification example 3 concerning the guide indication form.

FIG. 14 further shows a case where the image capturing apparatus 1 has the image analysis unit 226 including a coincidence degree determination unit 223 in the guide indication form in the modification example 3. Specifically, the image analysis unit 226 includes the coincidence degree determination unit 223 determining a coincidence degree between the guide 10 and the picture imaged by the image capturing unit 5. The image analysis determination unit 227 determines whether or not the imaged picture is adequate as the calibration image on the basis of the coincidence degree and outputs a determination result.

In determining the coincidence degree between the guide 10 and the imaged picture by the coincidence degree determination unit 223, specifically, an overlying degree between the guide 10 and the imaged picture is determined as the coincidence degree. The coincidence referred to herein does not mean coincidence in a strict sense. In other words, it is sufficient so long as the guide 10 and the imaged picture imaged by the image capturing unit 5 coincide with each other in a range in which a calibration image usable in calculating the parameter can be acquired. Concretely, it is sufficient so long as the guide 10 and the subject image appearing on the imaged picture overlie each other by 40% or more of the guide 10, preferably overlie each other by 60% or more of the guide 10, and more preferably overlie each other by 80% or more of the guide 10.

The image analysis determination unit 227 receives information on the coincidence degree, and then, determines whether or not the imaged picture is adequate as the calibration image on the basis of the coincidence degree.

Figure 15A:
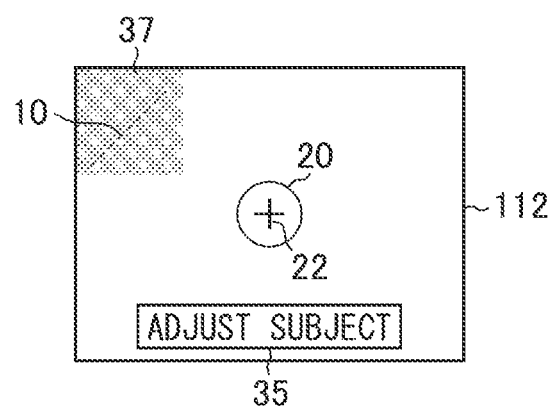
FIG. 15A is an illustration explaining the modification example 3 concerning the guide indication form.
Figure 15B:
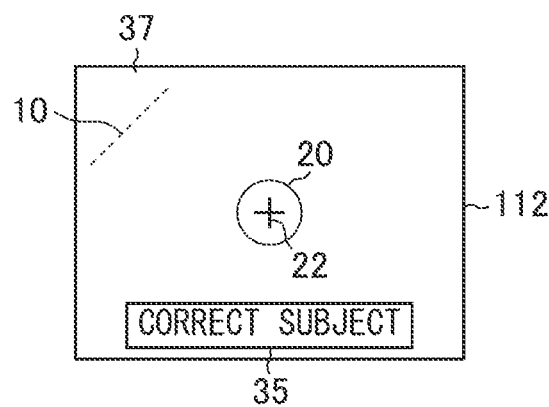
FIG. 15B is an illustration explaining the modification example 3 concerning the guide indication form.

FIG. 15A and FIG. 15B show the modification example 3 concerning the guide indication form in the case where the image analysis unit 226 has coincidence degree determination shown in FIG. 14. Elements similar to those in FIG. 6A to FIG. 6D are designated by the same reference numerals and the description thereof is omitted. In comparing the modification example 3 of the guide indication form shown in FIG. 15A and FIG. 15B with the guide indication pattern shown in FIG. 6A of the guide indication forms shown in FIG. 6A to FIG. 6D, the modification example 3 shown in FIG. 15A and FIG. 15B is different in that the determination information 35 on the guide 10 and imaged picture imaged by the image capturing unit 5 is displayed together with the guide 10 on the display screen 112 (display unit 225).

Concretely, FIG. 15A shows a case where a subject 37 is imaged with the imaged picture imaged by the image capturing unit 5 not coinciding with the guide 10. In FIG. 15A, the subject 37 does not coincide with the guide 10 arranged at the upper left. Additionally, the determination information 35 "adjust subject" is displayed on the display screen 112. On the other hand, FIG. 15B shows a case where a subject 39 coinciding with the guide 10 is imaged. In FIG. 15B, the subject 39 coincides with the guide 10 arranged at the upper left. Additionally, the determination information 35 "correct subject" is displayed on the display screen 112.

Also in a case shown in FIG. 12 where the image analysis unit 226 does not include the coincidence degree determination unit 223, the determination information 35 determined by the image analysis determination unit 227 is displayed as is in the modification example 3 concerning the guide indication form shown in FIG. 15A and FIG. 15B.

By using the guide indication form in the modification example 3, the calibration image can be precisely acquired.

Modification Example 4 of Guide Indication Form

Figure 17:
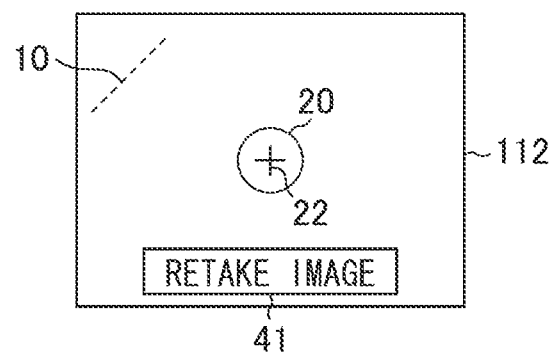
FIG. 17 is an illustration explaining the modification example 4 concerning the guide indication form.

With reference to FIG. 16 and FIG. 17, a description is given of a modification example 4 of the guide indication form.

In the modification example 4 of the guide indication form, determination information 41 sent from an optical transfer function determination unit 247 is further displayed on the display screen 112 (see FIG. 17).

FIG. 16 is an illustration explaining that the image capturing apparatus 1 has an optical transfer function holding unit 245 and the optical transfer function determination unit 247 in a case of using the guide indication form in the modification example 4. In comparing the image capturing apparatus 1 shown in FIG. 16 with the image capturing apparatus 1 shown in FIG. 7B, the image capturing apparatus 1 shown in FIG. 16 is different in having the optical transfer function holding unit 245 and the optical transfer function determination unit 247, from the image capturing apparatus 1 shown in FIG. 7B. Elements similar to those in FIG. 7B are designated by the same reference numerals and the description thereof is omitted.

The optical transfer function holding unit 245 stores therein in advance information on an optical transfer function of the lens as the parameter for the point image restoration process. Here, the information on the optical transfer function refers to a modulation transfer function (MTF) and/or phase transfer function (PTF) of the lens.

The parameter selecting instruction is transmitted from the point image restoration process control unit 235, and the information on the optical transfer function stored in advance is selected according to the parameter selecting instruction. Then, the selected optical transfer function is sent to the optical transfer function determination unit 247. On the other hand, the parameter calculation unit 228 calculates the information on the optical transfer function of the lens on the basis of the plurality of the calibration images imaged by the image capturing unit 5. Then, the parameter calculation unit 228 transmits the calculated information on the optical transfer function of the lens to the optical transfer function determination unit 247.

The optical transfer function determination unit 247 calculates a difference between the information on the optical transfer function of the lens calculated by the parameter calculation unit 228 and the information on the optical transfer function of the lens stored in advance in the optical transfer function holding unit 245. Then, the optical transfer function determination unit 247 determines whether or not the calculated difference is larger than a threshold, and transmits a determined result to the guide indication control unit 224.

Here, a concrete example of the threshold concerning determination of the calculated difference is described. For example, In a case where the information on the optical transfer function is a modulation transfer function, if the modulation transfer function imaged by way of the guide and calculated (the information on the optical transfer function of the lens calculated by the parameter calculation unit 228) is different, at a frequency (0.25 Fs) half the a Nyquist frequency, with respect to the modulation transfer function of design value (the information on the optical transfer function of the lens which is stored in advance in the optical transfer function holding unit 245), by 40% or more, preferably 50% or more of the modulation transfer function of design value, ringing occurs to deteriorate an image quality even if the modulation transfer function imaged by way of the guide and calculated is used for the calibration. Therefore, the user is prompted to retake an image, and in a case where the difference exceeds the threshold in spite of several retakes, the user is notified of non-adequacy by displaying an indication and the calibration is not performed.

In addition, for example, in a case where the information on the optical transfer function is a phase transfer function, if a phase shift direction obtained by imaging by way of the guide and calculating (the information on the optical transfer function of the lens calculated by the parameter calculation unit 228) is opposite to a direction of the design value (the information on the optical transfer function of the lens stored in advance in the optical transfer function holding unit 245), the image quality is deteriorated even if the phase shift direction obtained by imaging by way of the guide and calculating is used for the calibration. Therefore, the user is prompted to retake an image, and in a case where the difference exceeds the threshold in spite of several retakes, the user is notified of non-adequacy by displaying an indication and the calibration is not performed.

FIG. 17 shows the modification example 4 concerning the guide indication form. Elements similar to those in FIG. 6A to FIG. 6D are designated by the same reference numerals and the description thereof is omitted.

In comparing the guide indication form in FIG. 17 with the guide indication form in FIG. 6A to FIG. 6D, the guide indication form in FIG. 17 is different in that the determination information 41 generated by the optical transfer function determination unit 247 is displayed. In comparing the guide indication form in FIG. 17 with the guide indication form in FIG. 15A to FIG. 15B, the guide indication form in FIG. 17 is different in that content of the determination information 41 has content for prompting retake of the image. In other words, the content of the determination information 41 in FIG. 15A and FIG. 15B has content for prompting imaging of the different subject (see reference numeral 35 in FIG. 15A), whereas in FIG. 17, the content of the determination information 41 has content for prompting retake of the image.

As for the above description, in the modification example 4 concerning the guide indication form illustrated in FIG. 17, since acquisition of the calibration image is followed by acquisition of the determination information 41 by the optical transfer function determination unit 247, the determination information 41 has the content for prompting retake of the image. On the other hand, in the modification example 3 concerning the guide indication form illustrated in FIG. 15A and FIG. 15B, since the determination information 35 on the imaged picture imaged by the image capturing unit 5 (referred to as a live view image or through image) is acquired, the determination information 35 has the content for prompting change of the subject.

By using the guide indication form in the modification example 3, the precise calibration image can be acquired in accordance with the optical transfer function of the lens.

Another Guide Indication Pattern

Figure 18A:
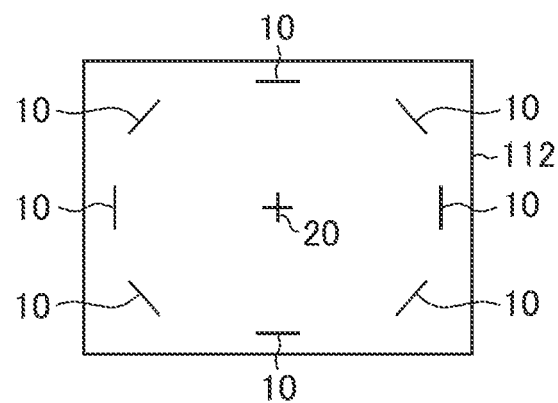
FIG. 18A is an illustration explaining another guide indication pattern.
Figure 18B:
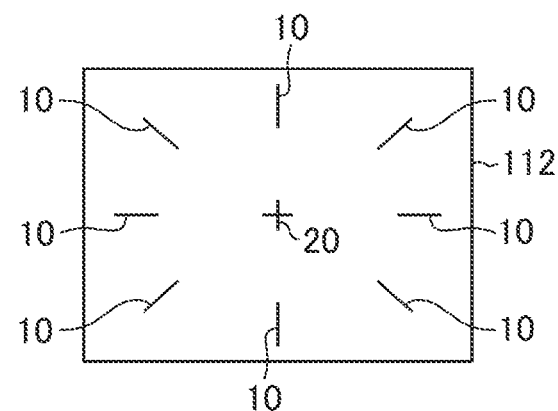
FIG. 18B is an illustration explaining another guide indication pattern.

FIG. 18A and FIG. 18B each show the guide indication pattern other than the guide indication pattern shown in FIG.

6A to FIG. 6D. Portions in FIG. 18 and FIG. 18B similar to those in FIG. 6A to FIG. 6D are designated by the same reference numerals and the description thereof is omitted. FIG. 18A shows a guide indication pattern 5. In comparing the guide indication pattern 5 shown in FIG. 18A with the guide indication pattern 4 shown in FIG. 6D, the guide indication pattern 5 shown in FIG. 18A is different in that the guide 10 is arranged at each of four corners and further four guides 10 are respectively arranged between four corners.

By using the guide indication pattern 5, more precise calibration image can be acquired.

FIG. 18B shows a guide indication pattern 6. In comparing the guide indication pattern 6 shown in FIG. 18B with the guide indication pattern 5 shown in FIG. 18A, a difference is that the respective guides 10 of one pattern are rotated by 90° with respect to those of the other pattern. In other words, the guide 10 shown in FIG. 18B is different in being linearly shaped along the sagittal direction in the imaged picture, from the guide indication pattern shown in FIG. 18A.

The guide 10 may be arranged not only in the tangential direction but also in the sagittal direction. By using the guide 10 having the guide indication pattern along the sagittal direction, the calibration image can be acquired corresponding to various subjects.

Application Example to EDoF System

The point image restoration process executed by use of the parameter for the point image restoration process in the above description is an image processing in which a point spread (point image blur) is recovered and corrected depending on a certain imaging condition (e.g., aperture value, focal length, kind of lens, etc.) to restore an original subject image, but the image processing to which the invention is applicable is not limited to the point image restoration process in the embodiments described above. For example, the point image restoration process according to the invention can also be applied to the point image restoration process on the image data which is imaged and obtained by the image capturing unit 5 including an optical system having an extended depth of field (focus) (EDoF). Execution of the point image restoration process on the image data of a blurred image which is imaged and obtained by an EDoF optical system with the depth of field (depth of focus) being extended makes it possible to restore and generate high resolution image data that is in focus in a wide range. In this case, the point image restoration process is executed using the restoration filter on the basis of the point spread function of the EDoF optical system (PSF, OTF (optical transfer function), MTF, PTF, etc.), the restoration filter having a filter coefficient set so that the good image restoration can be made in a range of the extended depth of field (depth of focus).

Hereinafter, a description is given of an exemplary system (EDoF system) relating to restoration of the image data that is imaged and obtained through the EDoF optical system. In the example shown below, the point image restoration process is also executed on the luminance signal (luminance signal Y) acquired from the image data (RGB data) after the demosaic process.

Figure 19:
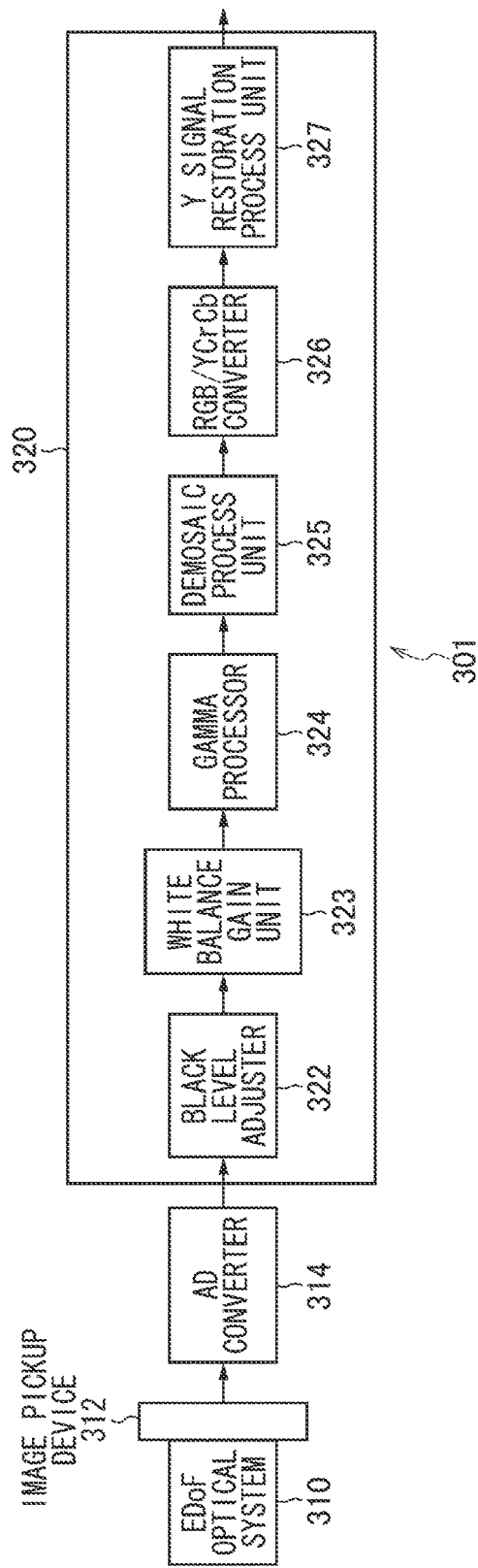
FIG. 19 is a block diagram showing a form of an image capturing module including an EDoF optical system.

FIG. 19 is a block diagram showing a form of an image capturing module 301 having the EDoF optical system. The image capturing module (digital camera, etc.) 301 in this example includes an EDoF optical system (lens unit) 310, image pickup device 312, A/D converter 314, and point image restoration process block (image processor) 320.

Figure 20:
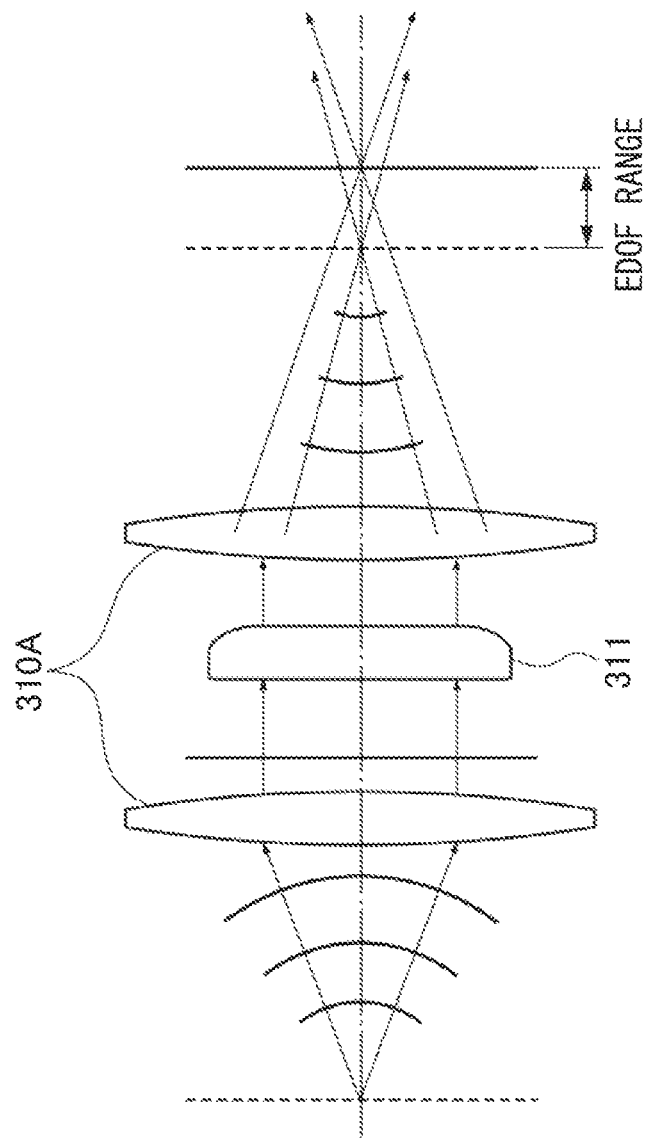
FIG. 20 is an illustration showing an example of the EDoF optical system.

FIG. 20 is an illustration showing an example of the EDoF optical system 310. The EDoF optical system 310 in this example has a single focus fixed imaging lens 310A and an optical filter 311 located at a pupil position. The optical filter 311 which modulates a phase makes the EDoF optical system 310 (imaging lens 310A) have the EDoF such that the extended depth of field (depth of focus) (EDoF) is obtained. In this way, the imaging lens 310A and the optical filter 311 constitute an imaging lens section which modulates the phase to extend the depth of field.

The EDoF optical system 310 may include other components as needed. For example, a diaphragm (omitted in the figure) can be disposed in the EDoF optical system 310 near the optical filter 311. The number of the optical filter 311 may be one, or a combination of plural optical filters may be used. The optical filter 311 is only an example of optical phase modulation device, and the EDoF optical system 310 (imaging lens 310A) may be made to have the EDoF by another device. For example, instead of disposing the optical filter 311, the imaging lens 310A whose lens is designed to have a function equivalent to that of the optical filter 311 of the example may achieve making the EDoF optical system 310 have the EDoF.

Specifically, the EDoF optical system 310 can be made to have the EDoF by use of various devices for changing a wavefront of an image formed on the light receiving surface of the image pickup device 312. For example, as the device for making EDoF optical system 310 have the EDoF, there may be used an "optical element whose thickness is variable", "optical element whose refractive index is variable (gradient index wavefront modulation lens, etc.)", "optical element whose thickness or refractive index is variable due to coding to the lens surface (wavefront modulation hybrid lens, optical element formed as a phase front on the lens surface, etc.)", and "liquid crystal element whose light phase distribution is modulatory (liquid crystal spatial phase modulation element, etc.)". In this way, the invention is applicable not only to a case where an image can be formed to be regularly distributed by use of the optical wavefront modulation element (optical filter 311 (phase plate)) but also to a case where an image with distribution similar to that obtained using the optical wavefront modulation element can be formed using the imaging lens 310A itself without using the optical wavefront modulation element.

The EDoF optical system 310 shown in FIG. 20 in which a focusing mechanism for mechanical focusing can be omitted may be reduced in size, and therefore, can be preferably mounted on a camera phone or a personal digital assistance.

The optical image after passing through the EDoF optical system 310 having been made to have the EDoF is formed into an image on the image pickup device 312 shown in FIG. 19 and converted into an electric signal in the device 312.

The image pickup device 312 is constituted by plural pixels arranged in a matrix in a predetermined pattern array (Bayer array, G-striped R/G-fully-checkered array, X-Trans (Registered Trademark) array, honeycomb array, etc.) and each pixel is configured to include a microlens, color filter (RGB color filter in the example) and photodiode. The optical image through the EDoF optical system 310 incident on the light receiving surface of the image pickup device 312 is converted into the signal electrical charge of an amount corresponding to an amount of its incident light by the photodiodes arranged on the light receiving surface. Then, the signal electrical charge of R, G, and B accumulated in the photodiodes is serially output as the voltage signal (image signal) for each pixel.

The A/D converter 314 converts analog R, G, and B image signals output for each pixel from the image pickup device 312 into digital RGB image signals. The digital image signal obtained through the digital image signal conversion by the A/D converter 314 is added to the point image restoration process block 320.

The point image restoration process block 320 includes, for example, a black level adjuster 322, white balance gain unit 323, gamma processor 324, demosaic process unit 325, RGB/YCrCb converter 326, and luminance signal Y point image restoration process unit (Y signal restoration process unit) 327.

The black level adjuster 322 subjects the digital image signal output from the A/D converter 314 to black level adjustment. The black level adjustment may be made by using a well-known method. For example, the black level adjustment is performed, with attention being put on a certain efficient photoelectric conversion element, by finding an average of signals for acquiring dark current amount respectively corresponding to plural OB photoelectric conversion elements included in a row of photoelectric conversion element containing the relevant efficient photoelectric conversion element, and subtracting the average from the signal for acquiring dark current amount corresponding to the relevant efficient photoelectric conversion element.

The white balance gain unit 323 performs gain adjustment depending on a white balance gain of each color signal of RGB included in the digital image signal having black level data adjusted.

The gamma processor 324 performs gamma correction for tone correction of halftone or the like so that the R, G, and B image signals having the white balance adjusted have desired gamma characteristics.

The demosaic process unit 325 performs the demosaic process on the R, G, and B image signals after subjected to the gamma correction. Specifically, the demosaic process unit 325 subjects the R, G, and B image signals to a color interpolation process to generate a set of image signals (R signal, G signal, B signal) output from the light received pixels in the image pickup device 312. That is to say, the pixel signal from each of light received pixels before a demosaic process is any of the R, G, and B image signals, but a set of three pixel signals of R, G, and B signals respectively corresponding to the light received pixels is output after the demosaic process.

The RGB/YCrCb converter 326 converts the R, G, and B signals for each pixel after subjected to the demosaic process into the luminance signal Y and the color-difference signals Cr and Cb to output the luminance signal Y and the color-difference signals Cr and Cb for each pixel.

The luminance signal Y point image restoration process unit 327 executes the point image restoration process on the luminance signal Y from the RGB/YCrCb converter 326 on the basis of the restoration filter stored in advance. The restoration filter includes a deconvolution kernel having a kernel size of 7×7 (corresponding to the number of taps, M=7, N=7), for example, and an operation coefficient corresponding to the deconvolution kernel (corresponding to restoration gain data, filter coefficient) and is used for the deconvolution process (deconvolution operation process) by an amount of phase modulation by the optical filter 311. The restoration filter corresponding to the optical filter 311 is stored in a memory which is not shown in the figure (e.g., memory incidentally provided in the luminance signal Y point image restoration process unit 327). The kernel size of the deconvolution kernel is not limited to 7×7.

Figure 21:
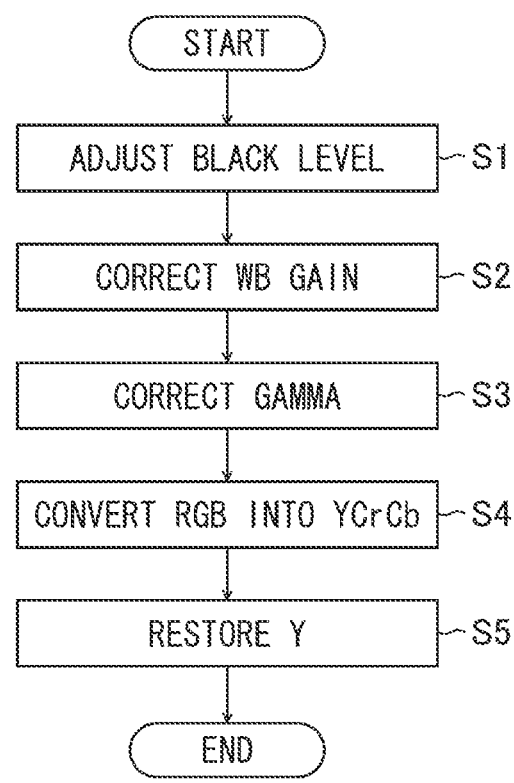
FIG. 21 is a flowchart showing an example of a restoration process in a restoration process block shown in FIG. 19.

Next, a description is given of the point image restoration process by the point image restoration process block 320. FIG. 21 is a flowchart showing an exemplary point image restoration process in the point image restoration process block 320 shown in FIG. 19.

The digital image signal is input from the A/D converter 314 to one of inputs of the black level adjuster 322 and the black level data is input to the other of the inputs. The black level adjuster 322 subtracts the black level data from the digital image signal and outputs the digital image signal from which the black level data has been subtracted to the white balance gain unit 323 (step S1). By doing so, the digital image signal does not include the black level component, and thus, the digital image signal indicating the black level is "0".

The image data after the black level adjustment is processed by the white balance gain unit 323 and the gamma processor 324 in this order (step S2 and S3).

The R, G, and B signals having been subjected to the gamma correction are subjected to the demosaic process by the demosaic process unit 325, and thereafter, converted into the luminance signal Y and the chrominance signals Cr and Cb in the RGB/YCrCb converter 326 (step S4).

The luminance signal Y point image restoration process unit 327 executes on the luminance signal Y the point image restoration process performing the deconvolution process by an amount of phase modulation by the optical filter 311 in the EDoF optical system 310 (step S5). Specifically, the luminance signal Y point image restoration process unit 327 performs the deconvolution process (deconvolution operation process) of the luminance signal (here, luminance signal of 7×7 pixels) corresponding to a pixel group in units of predetermined pixels the center of which group is any pixel as a target to be processed, and the restoration filter stored in the memory or the like in advance (deconvolution kernel of 7×7 and its operation coefficient). The luminance signal Y point image restoration process unit 327 executes the point image restoration process by repeating the deconvolution process for each pixel group in units of predetermined pixels so as to cover all over the area of an image pickup surface to eliminate an image blur across the image. The restoration filter is set depending on the position of the center of the pixel group subjected to the deconvolution process. In other words, a common restoration filter is applied to the pixel groups adjacent to each other. In order to simplify the point image restoration process, it is preferable to apply the common restoration filter to the all pixel groups.

Figure 22:
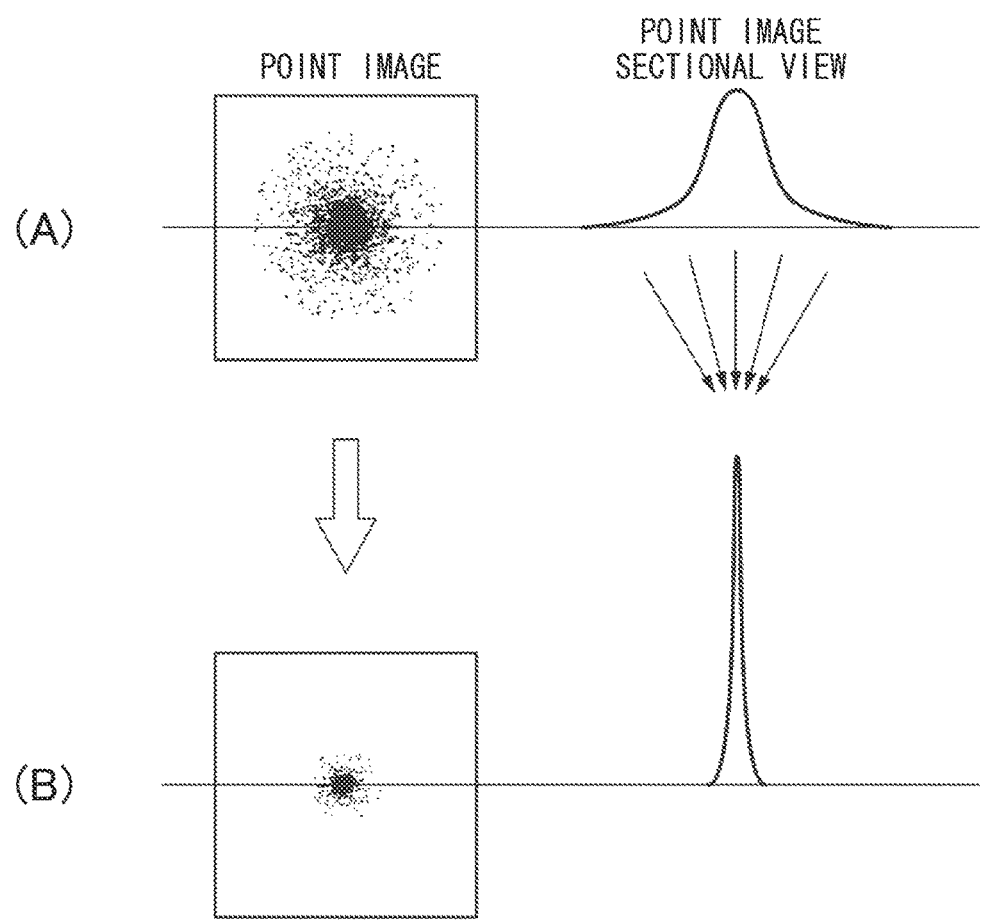
FIG. 22 is an illustration showing a state of a point image restored through the point image restoration process.

As described above, the point image (optical image) of the luminance signal after passing through the EDoF optical system 310 is formed into an image as a large point image (blurred image) on the image pickup device 312 as shown in (A) of FIG. 22 also in the application example of the Edof system, but is restored into a small point image (high resolution image) through the deconvolution process by the luminance signal Y point image restoration process unit 327 as shown in (B) of FIG. 22.

As described above, the execution of the point image restoration process on the luminance signal after the demosaic process can eliminate necessity of holding the parameters of the point image restoration process separately for RGB, and speed up the point image restoration process. Moreover, the deconvolution process in which the R, G, and B image signals corresponding to the R, G, and B pixels positioned apart at a distance are respectively collected in one unit is not performed, but the deconvolution process in which the luminance signals of adjacent pixels are collected in a predetermined unit, to which unit the common restoration filter is applied, is performed, improving the accuracy of the point image restoration process. As for the color-difference signals Cr and Cb, in terms of human eyes characteristics, even if the resolution is not improved by the point image restoration process, the quality of image is allowable. In a case where the image is recorded in a compression format such as JPEG, since the color-difference signal is compressed at a compression ratio higher than the luminance signal, there is little necessity to improve the resolution by the point image restoration process. In this way, both restoration accuracy improvement and simplification and speed-up of the process can be attained.

The point image restoration process according to the embodiments of the invention can be applied also to the point image restoration process in the EDoF system as described above.

Modification Example of Image Capturing Apparatus

Hereinbefore, the digital camera is described as the embodiment of the image capturing apparatus 1 according to the invention, but a configuration of an imaging device is not limited thereto. Examples of another imaging device according to the invention may include, for example, a built-in or external camera for PC (Personal Computer), or a portable terminal device having the imaging function as described below.

Examples of the portable terminal device as an embodiment of the imaging device according to the invention include, for example, mobile phones, smartphones, PDAs (Personal Digital Assistants), and portable game consoles. Hereinafter, a description is given in detail using the smartphone as an example with reference to the drawings.

Figure 23:
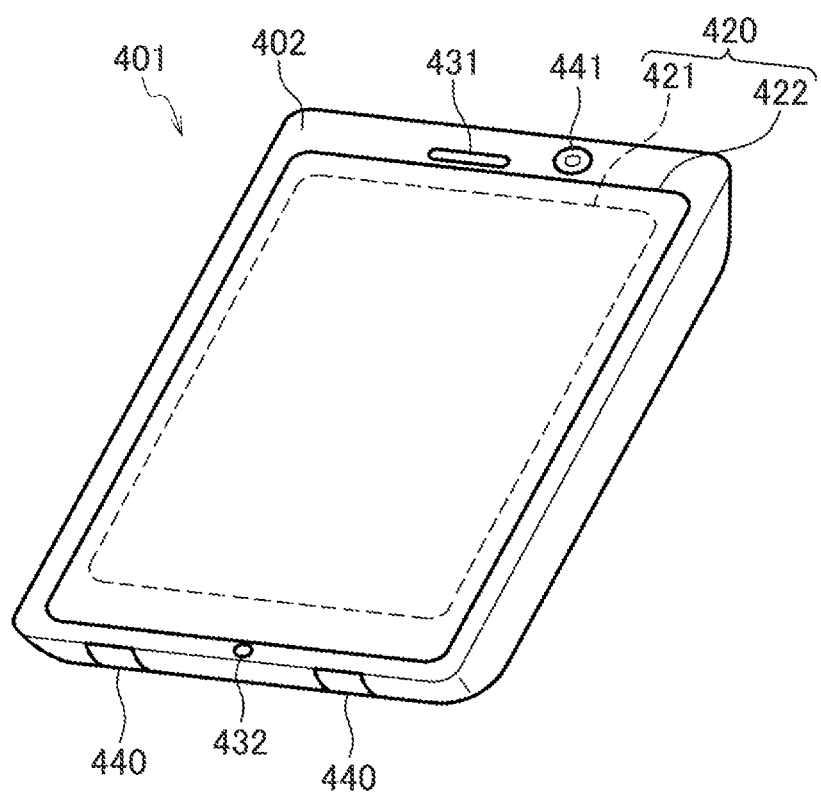
FIG. 23 is an illustration showing another aspect of the image capturing apparatus.

FIG. 23 shows an outer appearance of a smartphone 401 which is an embodiment of the imaging device of the invention. The smartphone 401 shown in FIG. 23 having a housing 402 shaped in a flat plate includes on one face of the housing 402 a display and input unit 420 in which a display panel 421 as a display unit and an operation panel 422 as an input unit are integrated. Such a housing 402 includes a speaker 431, microphone 432, operation unit 440, and camera unit 441. A configuration of the housing 402 is not limited thereto. For example, a configuration in which the display unit and the input unit are independent of each other may be used, and the housing 402 may use a configuration having a clamshell structure or a slide mechanism.

Figure 24:
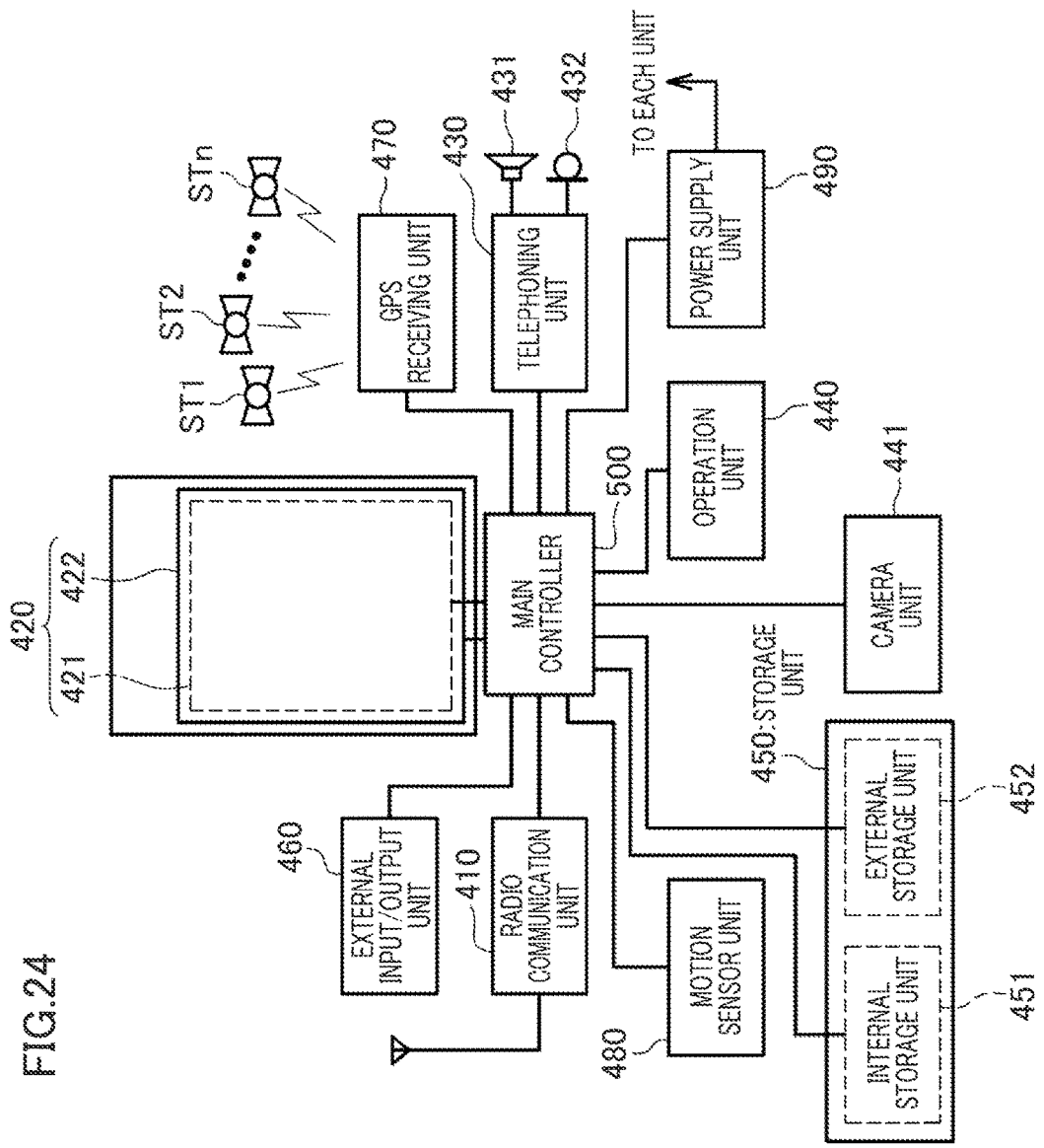
FIG. 24 is a block diagram showing a configuration of the image capturing apparatus shown in FIG. 23.

FIG. 24 is a block diagram showing the configuration of the smartphone 401 shown in FIG. 23. As shown in FIG. 24, included are as main components of the smartphone a radio communication unit 410, display and input unit 420, telephoning unit 430, operation unit 440, camera unit 441, storage unit 450, external input/output unit 460, GPS (Global Positioning System) receiving unit 470, motion sensor unit 480, power supply unit 490, and main controller 500. The smartphone 401 has, as a main function, a radio communication function for carrying out mobile radio communication with a base station device BS via a mobile communication network NW.

The radio communication unit 410 carries out radio communication with the base station device BS included in the mobile communication network NW according to an instruction from the main controller 500. Such radio communication is used to transmit and receive various pieces of file data such as audio data, image data and the like, and e-mail data and the like and receive Web data, streaming data and the like.

The display and input unit 420 is a so-called touch panel which, by way of control by the main controller 500, displays and visually delivers to a user an image (still image and moving image) and text information, as well as detects a user's operation on the displayed information, and includes the display panel 421 and the operation panel 422.

The display panel 421 uses a LCD (Liquid Crystal Display), an OELD (Organic Electro-Luminescence Display) and the like as a display device. The operation panel 422, which is placed such that an image displayed on a display surface of the display panel 421 can be visually recognized, is a device for detecting one or more coordinates operated by a user's finger or a stylus. If the device like this is operated by a user's finger or a stylus, a detection signal generated due to the operation is output to the main controller 500. Subsequently, the main controller 500 detects an operated position (coordinates) on the display panel 421 on the basis of the received detection signal.

As shown in FIG. 23, the display panel 421 and operation panel 422 in the smartphone 401 which is illustrated as an embodiment of the imaging device according to the invention are integrated to constitute the display and input unit 420, and the operation panel 422 is arranged in a manner to fully cover the display panel 421. In a case of using such an arrangement, the operation panel 422 may have a function to detect the user's operation on also an area outside the display panel 421. In other words, the operation panel 422 may have a detection area for an overlapping portion overlapped with the display panel 421 (hereinafter, referred to as a displayed area) and a detection area for a peripheral portion not overlapped with the display panel 421 other than the overlapping portion (hereinafter, referred to as a non-displayed area).

Note that a size of the displayed area and a size of the display panel 421 may completely match each other, but both sizes may not necessarily match. The operation panel 422 may have two sensitive areas of the peripheral portion and an inside portion other than that. Further, a width of the peripheral portion is appropriately designed depending on a size of the housing 402 and the like. A position detection method used for the operation panel 422 includes a matrix switch method, resistance film method, surface acoustic wave method, infrared ray method, electromagnetic induction method, electrostatic capacitance method and the like, any method of which may be used.

The telephoning unit 430 has the speaker 431 and the microphone 432. The telephoning unit 430 converts user voice input through the microphone 432 into the audio data processable by the main controller 500 to output to the main controller 500, and decodes the audio data received by the radio communication unit 410 or the external input/output unit 460 to output from the speaker 431. As shown in FIG. 23, for example, the speaker 431 may be mounted on the same face as the display and input unit 420 is provided, and the microphone 432 may be mounted on a lateral face of the housing 402.

The operation unit 440 which is a hardware key using a key switch and the like accepts an instruction from the user. For example, as shown in FIG. 23, the operation unit 440 is mounted on a lateral face of the housing 402 of the smartphone 401, and is a press-button type switch which is turned on when pressed down by a finger or the like and is brought into a turned-off state by a restoring force of a spring or the like when the finger is released.

The storage unit 450 stores a control program and control data for the main controller 500, application software, address data having a name, telephone number and the like of the communication other end associated with each other, data of transmitted and received e-mail, Web data downloaded by way of Web browsing, and downloaded content data, and transiently stores streaming data or the like. The storage unit 450 includes an internal storage unit 451 built in the smartphone and an external storage unit 452 having a detachable external memory slot. Each of the internal storage unit 451 and the external storage unit 452 included in the storage unit 450 is attained by use of a storage medium such as a flash memory type, hard disk type, multimedia card micro type, card type memory (e.g., Micro SD (registered trademark) memory, etc.), RAM (Random Access Memory), and ROM (Read Only Memory).

The external input/output unit 460 serves as an interface with all external devices coupled to the smartphone 401 to allow other external devices to be directly or indirectly connected via a communication or the like (e.g., USB (Universal Serial Bus), IEEE1394, etc.) or network (e.g., Internet, wireless LAN (Local Area Network), Bluetooth (registered trademark), RFID (Radio Frequency Identification), IrDA (Infrared Data Association) (registered trademark), UWB (Ultra Wideband) (registered trademark), ZigBee (registered trademark), etc.).

Examples of the external device coupled to the smartphone 401 include, for example, a wired/wireless head set, wired/wireless external charger, wired/wireless data port, memory card or SIM (Subscriber Identity Module Card)/UIM (User Identity Module Card) card connected via a card socket, external audio and video device connected via an audio and video I/O (Input/Output) terminal, external audio and video device wirelessly connected, smartphone via a wired/wireless connection, personal computer via a wired/wireless connection, PDA (Personal Digital Assistants) via a wired/wireless connection, personal computer via a wired/wireless connection, earphone, and the like. The external input/output unit 460 can deliver data received by way of transmission from such an external device above to the respective components in the smartphone 401 and transmit the data in the smartphone 401 to the external devices.

The GPS receiving unit 470 receives GPS signals transmitted from GPS satellites ST1 to STn to perform positioning arithmetic processing on the basis of the received plural GPS signals according to an instruction from the main controller 500, and detects a position including latitude, longitude, and altitude of the smartphone 401. When positional information can be acquired from the radio communication unit 410 or the external input/output unit 460 (e.g., wireless LAN), the GPS receiving unit 470 may use the positional information to detect the position.

The motion sensor unit 480 which includes, for example, a triaxial acceleration sensor or the like detects physical motion of the smartphone 401 according to an instruction from the main controller 500. Detection of the physical motion of the smartphone 401 allows a direction or acceleration of motion of the smartphone 401 to be detected. Such a detection result is to be output to the main controller 500.

The power supply unit 490 supplies electrical power stored in a battery (not shown) to each unit of the smartphone 401 according to an instruction from the main controller 500.

The main controller 500 which includes a microprocessor operates according to the control program or control data stored in the storage unit 450 and collectively controls the respective parts of the smartphone 401. The main controller 500 has a mobile communication controlling function to control each unit in a communication system and an application processing function in order to perform audio communication or data communication via the radio communication unit 410.

The application processing function is attained by the main controller 500 operating according to the application software stored in the storage unit 450. Examples of the application processing function include, for example, an infrared communication function to control the external input/output unit 460 to perform the data communication with a counterpart device, e-mail function to transmit and receive an e-mail, Web browsing function to view a Web page, and the like.

The main controller 500 has an image processing function to display a video on the display and input unit 420 and so forth on the basis of the image data such as the received data or the downloaded streaming data (data of still image and moving image). The image processing function refers to a function that the main controller 500 decodes the above image data and subjects such a decoding result to the image processing to display the image on the display and input unit 420.

Further, the main controller 500 performs display control of the display panel 421 and operation detecting control to detect the user's operation via the operation unit 440 and the operation panel 422.

The main controller 500 performs the display control to display an icon for starting the application software or a software key such as a scroll bar, or display a window for creating an e-mail. Note that the scroll bar refers to a software key for accepting an instruction to move a displayed portion of an image such as a large image not entirely accommodated within a displayed area of the display panel 421.

The main controller 500 performs the operation detecting control to detect the user's operation input via the operation unit 440, accept via the operation panel 422 an operation on the above icon or input of a character string to an input field in the above window, or accept a request input via the scroll bar for scrolling of the displayed image.

Further, the main controller 500 has a touch panel controlling function to perform the operation detecting control to determine whether an operated position on the operation panel 422 is the overlapping portion (displayed area) overlapped with the display panel 421 or the peripheral portion (non-displayed area) not overlapped with the display panel 421 other than the overlapping portion, and control the sensitive area of the operation panel 422 or a displayed position of the software key.

The main controller 500 can also detect a gesture operation on the operation panel 422 and perform a predetermined function depending on the detected gesture operation. The gesture operation means not a simple touch operation of related art, but an operation including tracking by a finger or the like, simultaneously specifying a plurality of positions, or combining these operations to track at least one of a plurality of positions.

The camera unit 441 is a digital camera electronically imaging by use of the image pickup device such as a CMOS (Complementary Metal Oxide Semiconductor) or a CCD (Charge-Coupled Device). The camera unit 441 can under the control of the main controller 500 convert the image data obtained by capturing an image into a compressed image data such as JPEG (Joint Photographic coding Experts Group), for example, to store in the storage unit 450 and output via the input/output unit 460 or the radio communication unit 410. In the smartphone 401 shown in FIG. 23, the camera unit 441 is mounted on the same face as the display and input unit 420, but, a mounted position of the camera unit 441 is not limited thereto. The camera unit 441 may be mounted on a rear face of the display and input unit 420, or a plurality of camera units 441 may be mounted. In the case where a plurality of camera units 441 are mounted, the camera unit 441 for imaging may be changed over for singularly imaging, or a plurality of camera units 441 may be simultaneously used for imaging.

The camera unit 441 can be used for the various functions of the smartphone 401. For example, an image obtained by the camera unit 441 may be displayed on the display panel 421, or an image of the camera unit 441 may be used as one of operation input on the operation panel 422. When the GPS receiving unit 470 detects a position, the position can be detected by referring an image from the camera unit 441. Further, by referring an image from the camera unit 441, without using the triaxial acceleration sensor or in combination with the triaxial acceleration sensor, an optical axis direction of the camera unit 441 of the smartphone 401 can be determined, and also a current usage environment can be determined. Of course, an image from the camera unit 441 may be used in the application software.

Besides, the image data of a still image or moving image may be added with the positional information obtained by the GPS receiving unit 470, voice information obtained by the microphone 432 (which may be voice-text converted by the main controller or the like into text information), attitude information obtained by the motion sensor unit 480 and the like to be stored in the storage unit 450 and be output via the input/output unit 460 or the radio communication unit 410.

The object of the invention may be also achieved by that a system or a computer in the device (or, CPU, MPU (Micro-Processing Unit)) reads out and executes a program code (program) from a storage medium (non-transitory recording medium) which has stored therein the program code implementing flow procedures shown in the embodiments described above.

In this case, the program code itself read out from the storage medium may achieve the functions of the embodiments described above. Therefore, the program code and a computer-readable storage medium storing/recording the program code therein may also configure one aspect of the invention.

Examples of the storage medium used for supplying the program code include, for example, a floppy (registered trademark) disk, hard disk, optical disk, magnetic optical disk, CD-ROM, CD-R (Compact Disc Recordable), magnetic tape, non-volatile memory card, ROM (Read Only Memory) and the like.

The functions of the embodiments described above may be achieved by that the computer executes the read out program. The execution of the program also includes a case where the OS (Operating System) or the like running on the computer executes a part or all of the actual processes on the basis of an instruction of the program.

Further, the functions of the embodiments described above may be achieved also by a function enhancement board inserted into the computer, or a function enhancement unit coupled with the computer. In this case, first, the program read out from the storage medium is written on a memory included in the function enhancement board inserted into the computer or in the function enhancement unit coupled with the computer. After that, the CPU or the like included in the function enhancement board or in the function enhancement unit executes a part or all of the actual processes on the basis of the instruction of the program. Processing performed by such a function enhancement board or function enhancement unit may also achieve the functions of the embodiments described above.

Each step in the flows of the embodiments described above may not be limited to being implemented using software (computer), but may be implemented using hardware (electronic circuit).

What is claimed is:

1. An image capturing apparatus comprising:
   an image capturing unit;
   a display unit, including a processor, that displays an imaged picture imaged by the image capturing unit and a guide linearly shaped along a sagittal direction or a tangential direction in at least one of four corners of the imaged picture, the guide assisting imaging of a calibration image used for calibration in a point image restoration process;
   a guide indication control unit included in the display unit that performs display control of the guide assisting the imaging of the calibration image used for the calibration in the point image restoration process; and
   a parameter calculation unit that calculates a parameter for the point image restoration process on the basis of the calibration image imaged by the image capturing unit with assistance from the guide.

2. The image capturing apparatus according to claim 1, wherein the guide displayed on the display unit is arranged depending on an image height of the imaged picture.

3. The image capturing apparatus according to claim 1, wherein the guide displayed on the display unit is a first guide or a second guide not parallel with the first guide.

4. The image capturing apparatus according to claim 1, wherein
   the image capturing unit has a bracketing imaging mode, and
   the parameter calculation unit calculates the parameter for the point image restoration process on the basis of a plurality of the calibration images imaged with bracketing by the image capturing unit with assistance from the guide.

5. The image capturing apparatus according to claim 4, wherein the image capturing unit images the calibration image for each f-number in the bracketing imaging mode.

6. The image capturing apparatus according to claim 1, wherein the parameter calculation unit calculates the parameter for the point image restoration process on the basis of the plurality of the calibration images imaged by the image capturing unit with assistance from the guide.

7. The image capturing apparatus according to claim 1, wherein
   the display unit further displays an imaging condition for imaging the calibration image, and
   the parameter calculation unit calculates the parameter for the point image restoration process under the imaging condition on the basis of the calibration image imaged by the image capturing unit with assistance from the guide.

8. The image capturing apparatus according to claim 1, wherein the image capturing unit has an interchangeable lens.

9. The image capturing apparatus according to claim 1, wherein the image capturing unit has a lens which modulates a phase to extend a depth of field.

10. The image capturing apparatus according to claim 1, further comprising a parameter holding unit that stores therein in advance the parameter for the point image restoration process,
wherein
the parameter calculation unit adjusts the parameter stored in the parameter holding unit on the basis of the calibration image imaged by the image capturing unit with assistance from the guide.

11. The image capturing apparatus according to claim 1, further comprising:
an image analysis unit that analyzes the imaged picture; and
an image analysis determination unit that determines whether or not the imaged picture is adequate as the calibration image on the basis of an analysis result of the imaged picture by the image analysis unit and outputs a determination result,
wherein
the display unit further displays determination information on the basis of the determination result.

12. The image capturing apparatus according to claim 11, wherein the image analysis unit analyzes the imaged picture regarding a brightness or blur amount of the imaged picture.

13. The image capturing apparatus according to claim 12, wherein
the image analysis unit acquires information on the f-number regarding the imaged picture, and analyzes the brightness of the imaged picture on the basis of a threshold of a exposure time set for the calibration, a threshold of an imaging sensitivity set for the calibration, and the acquired information on the f-number.

14. The image capturing apparatus according to claim 11, wherein
the image analysis unit further includes a coincidence degree determination unit that determines a coincidence degree between the guide and the imaged picture imaged by the image capturing unit and outputs a resultant coincidence degree, and
the image analysis determination unit determines whether or not the imaged picture is adequate as the calibration image on the basis of the resultant coincidence degree.

15. The image capturing apparatus according to claim 6, further comprising:
an optical transfer function holding unit that stores therein in advance information on an optical transfer function of the lens as the parameter for the point image restoration process; and
an optical transfer function determination unit that determines whether or not a difference is larger than a threshold, the difference being a difference between information on an optical transfer function of a lens calculated by the parameter calculation unit on the basis of the plurality of the calibration images imaged by the image capturing unit and the information on the optical transfer function of the lens stored in the optical transfer function holding unit, and outputs a determination result concerning the optical transfer function,
wherein
the display unit further displays determination information on the basis of the determination result concerning the optical transfer function.

16. The image capturing apparatus according to claim 15, wherein the information on the optical transfer function of the lens is at least one of a modulation transfer function and phase transfer function of the lens.

17. The image capturing apparatus according to claim 11, wherein the display unit displays an indication prompting change of the imaged picture depending on the determination result output by the image analysis determination unit.

18. The image capturing apparatus according to claim 15, wherein the display unit displays an indication prompting retake of the calibration image depending on the determination result output by the optical transfer function determination unit.

19. A calibration method comprising:
a displaying step of displaying a captured image imaged by an image capturing unit and a guide assisting imaging of a calibration image used for calibration in a point image restoration process on a display unit, the display unit including a processor, the guide linearly shaped along a sagittal direction or a tangential direction in at least one of four corners of the captured image, a guide indication control unit included in the display unit performing display control of the guide assisting the imaging of the calibration image used for the calibration in the point image restoration process; and
a parameter calculating step of calculating a parameter for the point image restoration process on the basis of the calibration image imaged by the image capturing unit with assistance from the guide.

20. A non-transitory computer-readable medium having a program recorded therein, the program for causing a processor, when an instruction stored in the medium is read out by the processor, to execute:
a displaying step of displaying a captured image imaged by an image capturing unit and a guide assisting imaging of a calibration image used for calibration in a point image restoration process on a display unit, the guide linearly shaped along a sagittal direction or a tangential direction in at least one of four corners of the captured image, a guide indication control unit included in the display unit performing display control of the guide assisting the imaging of the calibration image used for the calibration in the point image restoration process; and
a parameter calculating step of calculating a parameter for the point image restoration process on the basis of the calibration image imaged by the image capturing unit with assistance from the guide.

21. The image capturing image apparatus of claim 1, wherein the point image restoration process is based on a point spread function.

* * * * *